US008706625B2

(12) United States Patent
Vicente et al.

(10) Patent No.: US 8,706,625 B2
(45) Date of Patent: *Apr. 22, 2014

(54) SYSTEM AND METHOD FOR PROVIDING BORROWING SCHEMES

(71) Applicant: JPMorgan Chase Bank, N. A., New York, NY (US)

(72) Inventors: Maria Teresita Vicente, Marlton, NJ (US); Frank Cawley Dragotta, Philadelphia, PA (US); Manning R. Field, Media, PA (US); Joy Lynn Koppenhaver, Bear, DE (US); James Samuel Moed, Baltimore, MD (US); Ryan Alan Jacoby, New York, NY (US); Ian Michael Groulx, Oakland, CA (US); Kevin Thomas Dame, San Francisco, CA (US); Heather Margaret Emerson, San Francisco, CA (US); Jennifer C. McGarry, Haddonfield, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/759,212

(22) Filed: Feb. 5, 2013

(65) Prior Publication Data

US 2013/0151404 A1 Jun. 13, 2013

Related U.S. Application Data

(63) Continuation of application No. 13/445,592, filed on Apr. 12, 2012, now Pat. No. 8,538,876, which is a continuation of application No. 12/561,876, filed on Sep. 17, 2009, now Pat. No. 8,190,522, which is a continuation of application No. 12/372,510, filed on Feb. 17, 2009, now Pat. No. 8,078,528.

(60) Provisional application No. 61/030,474, filed on Feb. 21, 2008.

(51) Int. Cl.
*G06Q 40/00* (2012.01)
*G06Q 40/02* (2012.01)
*G06Q 30/02* (2012.01)

(52) U.S. Cl.
CPC ............ *G06Q 40/00* (2013.01); *G06Q 40/02* (2013.01); *G06Q 30/0207* (2013.01)
USPC .............................................. 705/40; 705/39

(58) Field of Classification Search
USPC .......... 235/379, 380; 705/35, 38, 36 R, 40, 4, 705/39, 34, 14.1
See application file for complete search history.

(56) References Cited

U.S. PATENT DOCUMENTS

| 4,205,780 | A | 6/1980 | Burns et al. |
| 4,319,336 | A | 3/1982 | Anderson et al. |

(Continued)

FOREIGN PATENT DOCUMENTS

| CA | 2293321 | 12/1998 |
| DE | 19702532 | 3/1998 |

(Continued)

OTHER PUBLICATIONS

Anonymous "GE launches new card for Coles Myer(GE Capital is reviving its Australian credit card business )" Feb. 8, 2002 Cards International , p. 7.*

(Continued)

*Primary Examiner* — Kelly Campen
(74) *Attorney, Agent, or Firm* — Hunton & Williams, LLP

(57) ABSTRACT

A system and method providing a borrowing scheme. The method comprises the steps of: establishing an interest-free revolving amount or account using the computer processor; establishing a periodic payment for maintaining the interest-free revolving amount or account using the computer processor; and automatically revising the interest-free revolving amount or account or the periodic payment using the computer processor based upon at least one user performance metric over a predetermined period of time; wherein the interest-free revolving amount or account or the periodic payment for maintaining the interest-free revolving amount is determined by the user via the network.

20 Claims, 22 Drawing Sheets

(56) References Cited

U.S. PATENT DOCUMENTS

| | | | |
|---|---|---|---|
| 4,321,672 | A | 3/1982 | Braun et al. |
| 4,701,601 | A | 10/1987 | Francini et al. |
| 4,713,760 | A | 12/1987 | Yamada et al. |
| 4,766,539 | A | 8/1988 | Fox |
| 4,822,985 | A | 4/1989 | Boggan et al. |
| 4,839,504 | A | 6/1989 | Nakano |
| 4,868,376 | A | 9/1989 | Lessin et al. |
| 4,870,259 | A | 9/1989 | Boggan et al. |
| 4,891,503 | A | 1/1990 | Jewell |
| 4,906,826 | A | 3/1990 | Spencer |
| 4,908,521 | A | 3/1990 | Boggan et al. |
| 4,943,707 | A | 7/1990 | Boggan |
| 4,948,174 | A | 8/1990 | Thomson et al. |
| 4,953,085 | A | 8/1990 | Atkins |
| 4,975,840 | A | 12/1990 | DeTore et al. |
| 5,025,372 | A | 6/1991 | Burton et al. |
| 5,056,019 | A | 10/1991 | Schultz et al. |
| 5,121,945 | A | 6/1992 | Thomson et al. |
| 5,122,950 | A | 6/1992 | Mee et al. |
| 5,175,416 | A | 12/1992 | Mansvelt |
| 5,175,682 | A | 12/1992 | Higashiyama |
| 5,177,342 | A | 1/1993 | Adams |
| 5,191,522 | A | 3/1993 | Bosco et al. |
| 5,265,008 | A | 11/1993 | Benton et al. |
| 5,326,959 | A | 7/1994 | Perazza |
| 5,326,960 | A | 7/1994 | Tannenbaum |
| 5,350,906 | A | 9/1994 | Brody et al. |
| 5,383,113 | A | 1/1995 | Knight |
| 5,412,190 | A | 5/1995 | Kopesec et al. |
| 5,428,684 | A | 6/1995 | Akiyama et al. |
| 5,432,326 | A | 7/1995 | Noblett et al. |
| 5,440,108 | A | 8/1995 | Tran et al. |
| 5,444,794 | A | 8/1995 | Uhland |
| 5,450,477 | A | 9/1995 | Amarant et al. |
| 5,453,601 | A | 9/1995 | Rosen |
| 5,455,407 | A | 10/1995 | Rosen |
| 5,465,206 | A | 11/1995 | Hilt et al. |
| 5,466,920 | A | 11/1995 | Nair et al. |
| 5,483,444 | A | 1/1996 | Heintzeman et al. |
| 5,483,445 | A * | 1/1996 | Pickering ................. 705/40 |
| 5,500,514 | A | 3/1996 | Veeneman et al. |
| 5,539,825 | A | 7/1996 | Akiyama et al. |
| 5,557,516 | A | 9/1996 | Hogan |
| 5,583,933 | A | 12/1996 | Mark |
| 5,590,038 | A | 12/1996 | Pitroda |
| 5,608,785 | A | 3/1997 | Kasday |
| 5,621,787 | A | 4/1997 | McKoy et al. |
| 5,637,845 | A | 6/1997 | Kolls |
| 5,642,485 | A | 6/1997 | Deaton et al. |
| 5,644,723 | A | 7/1997 | Deaton et al. |
| 5,644,727 | A | 7/1997 | Atkins |
| 5,649,114 | A | 7/1997 | Deaton et al. |
| 5,649,117 | A | 7/1997 | Landry |
| 5,652,786 | A | 7/1997 | Rogers |
| 5,659,741 | A | 8/1997 | Eberhardt |
| 5,677,955 | A | 10/1997 | Doggett et al. |
| 5,684,291 | A | 11/1997 | Taskett |
| 5,684,965 | A * | 11/1997 | Pickering ................. 705/34 |
| 5,687,322 | A | 11/1997 | Deaton et al. |
| 5,689,650 | A | 11/1997 | McClelland et al. |
| 5,704,044 | A | 12/1997 | Tarter et al. |
| 5,704,046 | A | 12/1997 | Hogan |
| 5,705,798 | A | 1/1998 | Tarbox |
| 5,708,422 | A | 1/1998 | Blonder et al. |
| 5,710,889 | A | 1/1998 | Clark et al. |
| 5,715,298 | A | 2/1998 | Rogers |
| 5,726,884 | A | 3/1998 | Sturgeon et al. |
| 5,737,421 | A | 4/1998 | Audebert |
| 5,742,775 | A | 4/1998 | King |
| 5,744,787 | A | 4/1998 | Teicher |
| 5,745,555 | A | 4/1998 | Mark |
| 5,748,737 | A | 5/1998 | Daggar |
| 5,787,403 | A | 7/1998 | Randle |
| 5,787,404 | A | 7/1998 | Fernandez-Holmann |
| 5,790,636 | A | 8/1998 | Marshall |
| 5,794,207 | A | 8/1998 | Walker |
| 5,796,827 | A | 8/1998 | Coppersmith et al. |
| 5,797,133 | A | 8/1998 | Jones |
| 5,799,087 | A | 8/1998 | Rosen |
| 5,802,176 | A | 9/1998 | Audebert |
| 5,806,042 | A | 9/1998 | Kelly et al. |
| 5,806,045 | A | 9/1998 | Biorge |
| 5,806,047 | A | 9/1998 | Hackel et al. |
| 5,815,657 | A | 9/1998 | Williams et al. |
| 5,825,871 | A | 10/1998 | Mark |
| 5,826,243 | A | 10/1998 | Musmanno et al. |
| 5,832,488 | A | 11/1998 | Eberhardt |
| 5,852,811 | A | 12/1998 | Atkins |
| 5,852,812 | A | 12/1998 | Reeder |
| 5,857,079 | A | 1/1999 | Claus et al. |
| 5,864,828 | A | 1/1999 | Atkins |
| 5,870,456 | A | 2/1999 | Rogers |
| 5,875,437 | A | 2/1999 | Atkins |
| 5,883,377 | A | 3/1999 | Chapin, Jr. |
| 5,884,271 | A | 3/1999 | Pitroda |
| 5,884,285 | A | 3/1999 | Atkins |
| 5,887,065 | A | 3/1999 | Audebert |
| 5,890,140 | A | 3/1999 | Clark et al. |
| 5,897,621 | A | 4/1999 | Boesch et al. |
| 5,903,879 | A | 5/1999 | Mitchell |
| 5,907,831 | A | 5/1999 | Lotvin et al. |
| 5,911,135 | A | 6/1999 | Atkins |
| 5,911,136 | A | 6/1999 | Atkins |
| 5,920,629 | A | 7/1999 | Rosen |
| 5,920,847 | A | 7/1999 | Kolling et al. |
| 5,926,792 | A | 7/1999 | Koppes et al. |
| 5,926,800 | A | 7/1999 | Baronowski et al. |
| 5,933,812 | A | 8/1999 | Meyer et al. |
| 5,933,817 | A * | 8/1999 | Hucal ................. 705/39 |
| 5,937,068 | A | 8/1999 | Audebert |
| 5,945,653 | A * | 8/1999 | Walker et al. ................. 235/380 |
| 5,953,423 | A | 9/1999 | Rosen |
| 5,963,648 | A | 10/1999 | Rosen |
| 5,970,469 | A | 10/1999 | Scroggie et al. |
| 5,970,478 | A * | 10/1999 | Walker et al. .................... 705/35 |
| 5,970,479 | A | 10/1999 | Shepherd |
| 5,974,399 | A | 10/1999 | Giuliani et al. |
| 5,984,191 | A | 11/1999 | Chapin, Jr. |
| 5,987,434 | A | 11/1999 | Libman |
| 5,988,509 | A | 11/1999 | Taskett |
| 5,991,413 | A | 11/1999 | Arditti et al. |
| 5,991,748 | A | 11/1999 | Taskett |
| 5,991,750 | A | 11/1999 | Watson |
| 5,999,917 | A | 12/1999 | Facciani et al. |
| 6,000,832 | A | 12/1999 | Franklin et al. |
| 6,006,988 | A | 12/1999 | Behrmann et al. |
| 6,009,415 | A | 12/1999 | Shurling et al. |
| 6,012,049 | A | 1/2000 | Kawan |
| 6,014,634 | A | 1/2000 | Scroggie et al. |
| 6,016,482 | A | 1/2000 | Molinari et al. |
| 6,018,718 | A | 1/2000 | Walker et al. |
| 6,029,139 | A | 2/2000 | Cunningham et al. |
| 6,047,067 | A | 4/2000 | Rosen |
| 6,049,782 | A | 4/2000 | Gottesman et al. |
| 6,058,378 | A | 5/2000 | Clark et al. |
| 6,061,660 | A | 5/2000 | Eggleston et al. |
| 6,064,985 | A | 5/2000 | Anderson |
| 6,070,067 | A | 5/2000 | Nguyen et al. |
| 6,076,068 | A | 6/2000 | DeLapa et al. |
| 6,076,072 | A | 6/2000 | Libman |
| 6,078,891 | A | 6/2000 | Riordan et al. |
| 6,085,976 | A | 7/2000 | Sehr |
| 6,089,284 | A | 7/2000 | Kaehler et al. |
| 6,105,006 | A | 8/2000 | Davis et al. |
| 6,105,008 | A | 8/2000 | Davis et al. |
| 6,108,642 | A | 8/2000 | Findley |
| 6,112,190 | A | 8/2000 | Fletcher et al. |
| 6,115,458 | A | 9/2000 | Taskett |
| 6,119,103 | A | 9/2000 | Basch et al. |
| 6,119,933 | A | 9/2000 | Wong et al. |
| 6,128,598 | A | 10/2000 | Walker et al. |
| 6,128,599 | A | 10/2000 | Walker et al. |
| 6,134,536 | A | 10/2000 | Shepherd |
| 6,138,917 | A | 10/2000 | Chapin, Jr. |

(56) References Cited

U.S. PATENT DOCUMENTS

| | | |
|---|---|---|
| 6,144,848 A | 11/2000 | Walsh et al. |
| 6,148,293 A | 11/2000 | King |
| 6,169,974 B1 | 1/2001 | Baumgartner et al. |
| 6,182,059 B1 | 1/2001 | Angotti et al. |
| 6,182,894 B1 | 2/2001 | Hackett et al. |
| 6,185,541 B1 | 2/2001 | Scroggie et al. |
| 6,227,445 B1 | 5/2001 | Brookner |
| 6,278,981 B1 | 8/2001 | Dembo et al. |
| 6,282,522 B1 | 8/2001 | Davis et al. |
| 6,289,324 B1 | 9/2001 | Kawan |
| 6,295,344 B1 | 9/2001 | Marshall |
| 6,315,196 B1 | 11/2001 | Bachman |
| 6,324,526 B1 | 11/2001 | D'Agostino |
| 6,327,573 B1 | 12/2001 | Walker et al. |
| 6,330,546 B1 | 12/2001 | Gopinathan et al. |
| 6,332,126 B1 | 12/2001 | Peirce et al. |
| 6,334,108 B1 | 12/2001 | Deaton et al. |
| 6,336,099 B1 | 1/2002 | Barnett et al. |
| 6,345,766 B1 | 2/2002 | Taskett et al. |
| 6,374,230 B1 | 4/2002 | Walker et al. |
| 6,377,669 B1 | 4/2002 | Walker et al. |
| 6,377,935 B1 | 4/2002 | Deaton et al. |
| 6,397,202 B1 | 5/2002 | Higgins et al. |
| 6,405,175 B1 | 6/2002 | Ng |
| 6,411,947 B1 | 6/2002 | Rice et al. |
| 6,422,462 B1 | 7/2002 | Cohen |
| 6,424,949 B1 | 7/2002 | Deaton et al. |
| 6,424,951 B1 | 7/2002 | Shurling et al. |
| 6,434,534 B1 | 8/2002 | Walker et al. |
| 6,450,407 B1 | 9/2002 | Freeman et al. |
| 6,473,500 B1 | 10/2002 | Risafi et al. |
| 6,490,568 B1 | 12/2002 | Omara et al. |
| 6,513,019 B2 | 1/2003 | Lewis |
| 6,516,302 B1 | 2/2003 | Deaton et al. |
| 6,553,113 B1 | 4/2003 | Dhir et al. |
| 6,557,039 B1 | 4/2003 | Leong et al. |
| 6,560,581 B1 | 5/2003 | Fox et al. |
| 6,567,821 B1 | 5/2003 | Polk |
| 6,571,216 B1 | 5/2003 | Garg et al. |
| 6,574,603 B1 | 6/2003 | Dickson et al. |
| 6,581,831 B2 | 6/2003 | Madani |
| 6,594,640 B1 | 7/2003 | Postrel |
| 6,595,342 B1 | 7/2003 | Maritzen et al. |
| 6,601,040 B1 | 7/2003 | Kolls |
| 6,609,104 B1 | 8/2003 | Deaton et al. |
| 6,609,658 B1 | 8/2003 | Sehr |
| 6,611,811 B1 | 8/2003 | Deaton et al. |
| 6,615,190 B1 | 9/2003 | Slater |
| 6,647,374 B2 | 11/2003 | Kansal |
| 6,659,259 B2 | 12/2003 | Knox et al. |
| 6,671,673 B1 | 12/2003 | Baseman et al. |
| 6,681,988 B2 * | 1/2004 | Stack et al. ............... 235/380 |
| 6,684,195 B1 | 1/2004 | Deaton et al. |
| 6,714,919 B1 | 3/2004 | Findley |
| 6,718,313 B1 | 4/2004 | Lent et al. |
| 6,795,812 B1 | 9/2004 | Lent et al. |
| 6,817,008 B2 | 11/2004 | Ledford et al. |
| 6,820,061 B2 | 11/2004 | Postrel |
| 6,829,586 B2 | 12/2004 | Postrel |
| 6,836,764 B1 * | 12/2004 | Hucal ............... 705/40 |
| 6,842,739 B2 | 1/2005 | Postrel |
| 6,845,906 B2 | 1/2005 | Royer et al. |
| 6,856,973 B1 | 2/2005 | Bott |
| 6,857,566 B2 | 2/2005 | Wankmueller |
| 6,868,426 B1 | 3/2005 | Mankoff |
| 6,885,994 B1 | 4/2005 | Scroggie et al. |
| 6,886,046 B2 | 4/2005 | Stutz et al. |
| 6,901,375 B2 | 5/2005 | Fernandez |
| 6,912,502 B1 | 6/2005 | Buddle et al. |
| 6,915,271 B1 | 7/2005 | Meyer et al. |
| RE38,801 E | 9/2005 | Rogers |
| 6,947,898 B2 | 9/2005 | Postrel |
| 6,954,741 B1 | 10/2005 | Burchetta et al. |
| 6,985,879 B2 | 1/2006 | Walker et al. |
| 6,999,569 B2 | 2/2006 | Risafi et al. |
| 6,999,938 B1 | 2/2006 | Libman |
| 6,999,943 B1 | 2/2006 | Johnson et al. |
| 7,006,992 B1 | 2/2006 | Packwood |
| 7,014,110 B2 | 3/2006 | Minowa et al. |
| 7,025,256 B1 | 4/2006 | Drummond et al. |
| 7,039,600 B1 | 5/2006 | Meek et al. |
| 7,050,996 B1 | 5/2006 | Blagg et al. |
| 7,063,924 B2 | 6/2006 | Kaminsky et al. |
| 7,069,244 B2 | 6/2006 | Strayer et al. |
| 7,072,909 B2 | 7/2006 | Polk |
| 7,076,458 B2 | 7/2006 | Lawlor et al. |
| 7,076,465 B1 | 7/2006 | Blagg et al. |
| 7,089,202 B1 | 8/2006 | McNamar et al. |
| 7,092,905 B2 | 8/2006 | Behrenbrinker et al. |
| 7,092,916 B2 | 8/2006 | Diveley |
| 7,104,443 B1 | 9/2006 | Paul et al. |
| 7,120,601 B2 | 10/2006 | Chen et al. |
| 7,121,471 B2 | 10/2006 | Beenau et al. |
| 7,165,049 B2 | 1/2007 | Slater |
| 7,167,844 B1 | 1/2007 | Leong et al. |
| 7,184,973 B2 | 2/2007 | Monteleone et al. |
| 7,216,091 B1 | 5/2007 | Blandina et al. |
| 7,239,226 B2 | 7/2007 | Berardi et al. |
| 7,243,839 B2 | 7/2007 | Beck et al. |
| 7,249,112 B2 | 7/2007 | Berardi et al. |
| 7,252,226 B2 | 8/2007 | Risafi et al. |
| 7,254,556 B2 * | 8/2007 | Fry ............... 705/39 |
| 7,260,549 B2 | 8/2007 | Spielmann et al. |
| 7,269,737 B2 | 9/2007 | Robinson |
| 7,295,999 B1 | 11/2007 | Simon et al. |
| 7,315,843 B2 | 1/2008 | Diveley et al. |
| 7,318,049 B2 * | 1/2008 | Iannacci ............... 705/39 |
| 7,356,516 B2 | 4/2008 | Richey et al. |
| 7,360,693 B1 | 4/2008 | Sullivan |
| 7,370,004 B1 | 5/2008 | Patel et al. |
| 7,392,221 B2 | 6/2008 | Nabe et al. |
| 7,392,222 B1 | 6/2008 | Hamilton et al. |
| 7,392,224 B1 | 6/2008 | Bauer et al. |
| 7,398,241 B2 | 7/2008 | Fay et al. |
| 7,401,731 B1 | 7/2008 | Pletz et al. |
| 7,406,442 B1 * | 7/2008 | Kottmeier et al. ............... 705/35 |
| 7,461,028 B2 | 12/2008 | Wronski, Jr. |
| 7,467,096 B2 | 12/2008 | Antonucci et al. |
| 7,502,758 B2 | 3/2009 | Burke |
| 7,506,806 B2 | 3/2009 | Bonalle et al. |
| 7,512,551 B2 | 3/2009 | Postrel |
| 7,523,385 B2 | 4/2009 | Nguyen et al. |
| 7,526,449 B1 | 4/2009 | Blossom |
| 7,580,857 B2 | 8/2009 | VanFleet et al. |
| 7,587,363 B2 | 9/2009 | Cataline et al. |
| 7,606,730 B2 | 10/2009 | Antonucci |
| 7,613,629 B2 | 11/2009 | Antonucci et al. |
| 7,624,068 B1 | 11/2009 | Heasley et al. |
| 7,676,409 B1 | 3/2010 | Ahmad |
| 7,689,504 B2 | 3/2010 | Warren et al. |
| 7,729,925 B2 | 6/2010 | Maritzen et al. |
| 7,747,525 B2 * | 6/2010 | Grant et al. ............... 705/39 |
| 7,753,259 B2 | 7/2010 | Taylor et al. |
| 7,913,903 B1 | 3/2011 | Jones et al. |
| 7,925,583 B2 | 4/2011 | Heasley et al. |
| 7,926,711 B2 * | 4/2011 | Taylor et al. ............... 235/379 |
| 7,954,708 B2 | 6/2011 | Blossom |
| 8,078,528 B1 | 12/2011 | Vicente |
| 2001/0001856 A1 | 5/2001 | Gould et al. |
| 2001/0014868 A1 | 8/2001 | Herz et al. |
| 2001/0027389 A1 | 10/2001 | Beverina et al. |
| 2001/0034651 A1 | 10/2001 | Marks et al. |
| 2001/0034663 A1 | 10/2001 | Teveler et al. |
| 2001/0034684 A1 | 10/2001 | Cushing et al. |
| 2001/0034718 A1 | 10/2001 | Shaked et al. |
| 2001/0034720 A1 | 10/2001 | Armes |
| 2001/0037276 A1 | 11/2001 | Kelly et al. |
| 2001/0037299 A1 | 11/2001 | Nichols et al. |
| 2001/0037315 A1 | 11/2001 | Saliba et al. |
| 2001/0044733 A1 | 11/2001 | Lee et al. |
| 2001/0054003 A1 | 12/2001 | Chien et al. |
| 2001/0056398 A1 | 12/2001 | Scheirer |
| 2002/0010591 A1 | 1/2002 | Pomerance |
| 2002/0013751 A1 | 1/2002 | Facciani et al. |

(56) References Cited

U.S. PATENT DOCUMENTS

| | | |
|---|---|---|
| 2002/0019793 A1 | 2/2002 | Frattalone |
| 2002/0026416 A1 | 2/2002 | Provinse |
| 2002/0032609 A1 | 3/2002 | Wilkman |
| 2002/0040344 A1 | 4/2002 | Preiser et al. |
| 2002/0046089 A1 | 4/2002 | Zorn |
| 2002/0046110 A1 | 4/2002 | Gallagher |
| 2002/0046116 A1 | 4/2002 | Hohle et al. |
| 2002/0052778 A1 | 5/2002 | Murphy et al. |
| 2002/0059103 A1 | 5/2002 | Anderson et al. |
| 2002/0059139 A1 | 5/2002 | Evans |
| 2002/0062235 A1 | 5/2002 | Wahlbin et al. |
| 2002/0062249 A1* | 5/2002 | Iannacci ......................... 705/14 |
| 2002/0062253 A1 | 5/2002 | Dosh et al. |
| 2002/0069104 A1 | 6/2002 | Beach et al. |
| 2002/0069109 A1 | 6/2002 | Wendkos |
| 2002/0069122 A1 | 6/2002 | Yun et al. |
| 2002/0070976 A1 | 6/2002 | Tanner et al. |
| 2002/0072974 A1 | 6/2002 | Pugliese et al. |
| 2002/0073042 A1 | 6/2002 | Maritzen et al. |
| 2002/0077904 A1 | 6/2002 | Ali |
| 2002/0077964 A1 | 6/2002 | Brody et al. |
| 2002/0077966 A1 | 6/2002 | Harycki et al. |
| 2002/0082920 A1 | 6/2002 | Austin et al. |
| 2002/0082962 A1 | 6/2002 | Farris et al. |
| 2002/0087373 A1 | 7/2002 | Dickstein et al. |
| 2002/0091632 A1 | 7/2002 | Turock et al. |
| 2002/0091649 A1 | 7/2002 | Anvekar et al. |
| 2002/0095365 A1 | 7/2002 | Slavin et al. |
| 2002/0099586 A1 | 7/2002 | Bladen et al. |
| 2002/0099649 A1 | 7/2002 | Lee et al. |
| 2002/0107731 A1 | 8/2002 | Teng |
| 2002/0111859 A1 | 8/2002 | Sheldon et al. |
| 2002/0111886 A1 | 8/2002 | Chenevich et al. |
| 2002/0111891 A1 | 8/2002 | Hoffman et al. |
| 2002/0111916 A1 | 8/2002 | Coronna et al. |
| 2002/0116266 A1 | 8/2002 | Marshall |
| 2002/0116330 A1 | 8/2002 | Hed et al. |
| 2002/0116331 A1 | 8/2002 | Cataline et al. |
| 2002/0120571 A1 | 8/2002 | Maung et al. |
| 2002/0120627 A1 | 8/2002 | Mankoff |
| 2002/0120846 A1 | 8/2002 | Stewart et al. |
| 2002/0129221 A1 | 9/2002 | Borgin et al. |
| 2002/0133461 A1 | 9/2002 | Ramachandran |
| 2002/0143621 A1 | 10/2002 | Donnelly et al. |
| 2002/0143626 A1 | 10/2002 | Voltmer et al. |
| 2002/0147691 A1 | 10/2002 | Davis et al. |
| 2002/0152116 A1 | 10/2002 | Yan et al. |
| 2002/0152179 A1 | 10/2002 | Racov |
| 2002/0156723 A1 | 10/2002 | Lilly et al. |
| 2002/0161630 A1 | 10/2002 | Kern et al. |
| 2002/0165808 A1 | 11/2002 | Zamsky et al. |
| 2002/0174011 A1 | 11/2002 | Sanchez et al. |
| 2002/0174030 A1 | 11/2002 | Praisner et al. |
| 2002/0178112 A1 | 11/2002 | Goeller et al. |
| 2002/0187825 A1 | 12/2002 | Tracy et al. |
| 2002/0188478 A1 | 12/2002 | Breeland et al. |
| 2002/0188509 A1 | 12/2002 | Ariff et al. |
| 2002/0188511 A1 | 12/2002 | Johnson et al. |
| 2002/0188533 A1* | 12/2002 | Sanchez et al. ................ 705/30 |
| 2002/0194081 A1 | 12/2002 | Perkowski |
| 2002/0194098 A1 | 12/2002 | Stiff et al. |
| 2002/0194119 A1 | 12/2002 | Wright et al. |
| 2002/0198803 A1 | 12/2002 | Rowe |
| 2002/0198807 A1 | 12/2002 | Kobayashi et al. |
| 2003/0004809 A1 | 1/2003 | Palcic et al. |
| 2003/0004828 A1 | 1/2003 | Epstein |
| 2003/0009393 A1 | 1/2003 | Norris |
| 2003/0018613 A1 | 1/2003 | Oytac |
| 2003/0023549 A1 | 1/2003 | Armes et al. |
| 2003/0028483 A1 | 2/2003 | Sanders et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0040959 A1 | 2/2003 | Fei et al. |
| 2003/0040964 A1 | 2/2003 | Lacek |
| 2003/0050831 A1 | 3/2003 | Klayh |
| 2003/0053609 A1 | 3/2003 | Risafi et al. |
| 2003/0055782 A1 | 3/2003 | Slater |
| 2003/0061093 A1 | 3/2003 | Todd |
| 2003/0061097 A1* | 3/2003 | Walker et al. .................... 705/14 |
| 2003/0064788 A1* | 4/2003 | Walker et al. .................... 463/20 |
| 2003/0074290 A1 | 4/2003 | Clore |
| 2003/0078815 A1 | 4/2003 | Parsons |
| 2003/0101119 A1 | 5/2003 | Persons et al. |
| 2003/0105672 A1 | 6/2003 | Epstein et al. |
| 2003/0105689 A1 | 6/2003 | Chandak et al. |
| 2003/0110111 A1 | 6/2003 | Nalebuff et al. |
| 2003/0120571 A1 | 6/2003 | Blagg |
| 2003/0135453 A1 | 7/2003 | Caulfield et al. |
| 2003/0144935 A1 | 7/2003 | Sobek |
| 2003/0149660 A1 | 8/2003 | Canfield |
| 2003/0158776 A1 | 8/2003 | Landesmann |
| 2003/0167220 A1 | 9/2003 | Schoen et al. |
| 2003/0171992 A1 | 9/2003 | Blagg et al. |
| 2003/0172040 A1 | 9/2003 | Kemper et al. |
| 2003/0182218 A1 | 9/2003 | Blagg |
| 2003/0200142 A1 | 10/2003 | Hicks et al. |
| 2003/0200180 A1 | 10/2003 | Phelan et al. |
| 2003/0204421 A1 | 10/2003 | Houle et al. |
| 2003/0205617 A1 | 11/2003 | Allen et al. |
| 2003/0208439 A1 | 11/2003 | Rast |
| 2003/0216964 A1 | 11/2003 | MacLean et al. |
| 2003/0216965 A1 | 11/2003 | Libman |
| 2003/0217003 A1 | 11/2003 | Weinflash et al. |
| 2003/0217005 A1 | 11/2003 | Drummond et al. |
| 2003/0218066 A1 | 11/2003 | Fernandes et al. |
| 2003/0222136 A1 | 12/2003 | Bolle et al. |
| 2003/0225619 A1 | 12/2003 | Dokken et al. |
| 2003/0229525 A1 | 12/2003 | Callahan et al. |
| 2003/0229589 A1* | 12/2003 | Rosenblatt et al. ............. 705/40 |
| 2003/0229590 A1 | 12/2003 | Byrne et al. |
| 2003/0233278 A1 | 12/2003 | Marshall |
| 2003/0236712 A1 | 12/2003 | Antonucci et al. |
| 2004/0006487 A1 | 1/2004 | Tari |
| 2004/0030626 A1 | 2/2004 | Libman |
| 2004/0039588 A1 | 2/2004 | Libman |
| 2004/0049452 A1 | 3/2004 | Blagg |
| 2004/0059952 A1 | 3/2004 | Newport et al. |
| 2004/0078328 A1 | 4/2004 | Talbert et al. |
| 2004/0088238 A1 | 5/2004 | Gilson et al. |
| 2004/0093296 A1 | 5/2004 | Phelan et al. |
| 2004/0094624 A1 | 5/2004 | Fernandes et al. |
| 2004/0098351 A1 | 5/2004 | Duke |
| 2004/0111363 A1 | 6/2004 | Trench et al. |
| 2004/0117202 A1 | 6/2004 | Winklevoss et al. |
| 2004/0118914 A1 | 6/2004 | Smith et al. |
| 2004/0122736 A1 | 6/2004 | Strock et al. |
| 2004/0128186 A1 | 7/2004 | Breslin et al. |
| 2004/0128195 A1 | 7/2004 | Sorem |
| 2004/0159700 A1 | 8/2004 | Khan et al. |
| 2004/0172350 A1 | 9/2004 | Atkinson et al. |
| 2004/0172358 A1 | 9/2004 | Lent et al. |
| 2004/0199406 A1 | 10/2004 | Owens et al. |
| 2004/0210498 A1 | 10/2004 | Freund |
| 2004/0210531 A1 | 10/2004 | Barron et al. |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0243468 A1 | 12/2004 | Cohagan et al. |
| 2004/0243498 A1 | 12/2004 | Duke |
| 2004/0243506 A1 | 12/2004 | Das |
| 2004/0249689 A1 | 12/2004 | Naraki et al. |
| 2004/0249710 A1 | 12/2004 | Smith et al. |
| 2004/0249764 A1 | 12/2004 | Delitz et al. |
| 2004/0252012 A1 | 12/2004 | Beenau et al. |
| 2005/0004839 A1 | 1/2005 | Bakker et al. |
| 2005/0004864 A1 | 1/2005 | Lent et al. |
| 2005/0021353 A1 | 1/2005 | Aviles et al. |
| 2005/0021400 A1 | 1/2005 | Postrel |
| 2005/0023346 A1 | 2/2005 | Bakker et al. |
| 2005/0033619 A1 | 2/2005 | Barnes et al. |
| 2005/0033637 A1* | 2/2005 | Underwood ..................... 705/14 |
| 2005/0035192 A1 | 2/2005 | Bonalle et al. |
| 2005/0035847 A1 | 2/2005 | Bonalle et al. |

(56) References Cited

U.S. PATENT DOCUMENTS

| | | |
|---|---|---|
| 2005/0071226 A1 | 3/2005 | Nguyen et al. |
| 2005/0071230 A1 | 3/2005 | Mankoff |
| 2005/0075932 A1 | 4/2005 | Mankoff |
| 2005/0077349 A1 | 4/2005 | Bonalle et al. |
| 2005/0086160 A1 | 4/2005 | Wong et al. |
| 2005/0097033 A1 | 5/2005 | Pretell et al. |
| 2005/0108064 A1 | 5/2005 | Castleman et al. |
| 2005/0108152 A1 | 5/2005 | Tsao Lee et al. |
| 2005/0114883 A1 | 5/2005 | Nagai et al. |
| 2005/0125295 A1 | 6/2005 | Tidwell et al. |
| 2005/0125296 A1 | 6/2005 | Tidwell et al. |
| 2005/0125337 A1 | 6/2005 | Tidwell et al. |
| 2005/0125338 A1 | 6/2005 | Tidwell et al. |
| 2005/0125339 A1 | 6/2005 | Tidwell et al. |
| 2005/0125350 A1 | 6/2005 | Tidwell et al. |
| 2005/0125351 A1 | 6/2005 | Tidwell et al. |
| 2005/0125360 A1 | 6/2005 | Tidwell et al. |
| 2005/0131792 A1 | 6/2005 | Rowe |
| 2005/0137982 A1 | 6/2005 | Michelassi et al. |
| 2005/0144074 A1 | 6/2005 | Fredregill et al. |
| 2005/0149393 A1 | 7/2005 | Leof |
| 2005/0154664 A1 | 7/2005 | Guy et al. |
| 2005/0159986 A1 | 7/2005 | Breeland et al. |
| 2005/0171842 A1 | 8/2005 | Tien et al. |
| 2005/0171898 A1 | 8/2005 | Bishop et al. |
| 2005/0177503 A1 | 8/2005 | Thomas |
| 2005/0192862 A1 | 9/2005 | Modi |
| 2005/0199705 A1 | 9/2005 | Beck et al. |
| 2005/0203824 A1 | 9/2005 | Freud et al. |
| 2005/0216888 A1 | 9/2005 | Drummond et al. |
| 2005/0222906 A1 | 10/2005 | Chen |
| 2005/0234773 A1 | 10/2005 | Hirst et al. |
| 2005/0240477 A1 | 10/2005 | Friday et al. |
| 2005/0256802 A1 | 11/2005 | Ammermann et al. |
| 2006/0004629 A1 | 1/2006 | Neemann et al. |
| 2006/0011719 A1 | 1/2006 | Lehtonen et al. |
| 2006/0015463 A1 | 1/2006 | Gupta et al. |
| 2006/0036543 A1 | 2/2006 | Blagg et al. |
| 2006/0036553 A1 | 2/2006 | Gupta et al. |
| 2006/0047573 A1 | 3/2006 | Mitchell et al. |
| 2006/0053056 A1 | 3/2006 | Alspach-Gross et al. |
| 2006/0064329 A1 | 3/2006 | Abolfathi et al. |
| 2006/0085334 A1 | 4/2006 | Murphy |
| 2006/0106696 A1 | 5/2006 | Carlson |
| 2006/0149671 A1 | 7/2006 | Nix et al. |
| 2006/0224480 A1 | 10/2006 | Bent et al. |
| 2006/0249574 A1 | 11/2006 | Brown et al. |
| 2006/0259364 A1* | 11/2006 | Strock et al. ............. 705/14 |
| 2006/0259390 A1 | 11/2006 | Rosenberger |
| 2007/0038515 A1 | 2/2007 | Postrel |
| 2007/0078719 A1 | 4/2007 | Schmitt et al. |
| 2007/0136211 A1 | 6/2007 | Brown et al. |
| 2007/0156530 A1 | 7/2007 | Schmitt et al. |
| 2007/0168282 A1 | 7/2007 | Giordano |
| 2007/0208671 A1 | 9/2007 | Brown et al. |
| 2007/0214057 A1* | 9/2007 | Lee et al. ............. 705/26 |
| 2007/0250442 A1 | 10/2007 | Hogan et al. |
| 2008/0005018 A1 | 1/2008 | Powell |
| 2008/0027841 A1 | 1/2008 | Eder |
| 2008/0109358 A1 | 5/2008 | Kottmeier, Jr. et al. |
| 2008/0133350 A1 | 6/2008 | White et al. |
| 2008/0262915 A1 | 10/2008 | Gojkovic et al. |
| 2008/0275779 A1* | 11/2008 | Lakshminarayanan ......... 705/14 |
| 2008/0277465 A1 | 11/2008 | Pletz et al. |
| 2008/0288396 A1 | 11/2008 | Siggers et al. |
| 2008/0301041 A1 | 12/2008 | Bruk |
| 2009/0048972 A1 | 2/2009 | Bierer et al. |
| 2009/0112639 A1 | 4/2009 | Beaver |
| 2009/0171778 A1 | 7/2009 | Powell |
| 2009/0265275 A1 | 10/2009 | Everhart |
| 2009/0313106 A1 | 12/2009 | Taylor et al. |
| 2010/0057553 A1 | 3/2010 | Ameiss et al. |
| 2010/0153199 A1 | 6/2010 | Ahmad |

FOREIGN PATENT DOCUMENTS

| | | |
|---|---|---|
| EP | 0590861 | 1/2001 |
| GB | 2376787 | 12/2002 |
| WO | 9858345 | 12/1998 |
| WO | 99/05633 | 2/1999 |
| WO | 2008/021381 | 2/2008 |
| WO | 2008/021382 | 2/2008 |

OTHER PUBLICATIONS

Kim et al. "Bank competition and consumer search over credit card interest rates. " Apr. 2005 Economic Inquiry , 43 , 2 , 344(10).*

Britt, Competing in Auto Lending, America's Community Banker, vol. 5, No. 11, Nov. 1, 1996, pp. 33-37.

McMonagle, Daniel, McMonagle, Chapter VII—Cash Balance Plans in a Traditional Defined Benefit World, as found on google.scholar (dev.soa.org, Jan. 2002), www.soa.org/.../monographs/retirement-systems/cash-balance-symposium/2002/january/m-rs02-3-07.pdf-May 7, 2009.

Brown et al., Purchasing Card Magic Eli Lilly Finds Accounts Payable Flying High With Plastic, Corporate Cashflow, vol. 15, No. 12, Nov. 1994, 2 pages.

Spurgin, Sopininmon! or What's Happening in the Retail Credit Card Environment, Credit World Journal, vol. 85, No. 4, Mar. 1, 1997, pp. 20-23.

Office Action issued Jan. 5, 2011 in corresponding U.S. Appl. No. 12/372,554.

Office Action issued Jan. 14, 2011 in corresponding U.S. Appl. No. 12/372,617.

Office Action issued Feb. 1, 2011 in corresponding U.S. Appl. No. 12/372,710.

Office Action issued Mar. 22, 2011 in corresponding U.S. Appl. No. 12/372,716.

Anonymous, "GE Launches New Card for Coles Myer (GE is Reviving its Austrian Credit Card Business)" Feb. 8, 2002, Cards International, pp. 7.

* cited by examiner

Simplify your finances with the Chase Interest Free credit card. Now you can use a credit card without worrying about how much interest you'll be charged because your APR is 0% always. It's straightforward and simple.

---

How it works:

- The cost is a flat $50 a month for a $5,000 credit line

- NO finance charges or changing interest rates

- Use it just like any other credit card - but forget all the complicated rate calculations

- Eliminates the guesswork in your bill & on your statement

With Chase Interest Free you don't have to worry about interest or finance charges any more. A credit card that is upfront and predictable . . . now that couldn't be easier!

Figure 3c

CHASE

▲My Accounts | ▲Payments & Transfers | ▲Products & Services | ▲Customer Center Chase Online℠    Chase.com | Contact Us | Privacy Policy | [SEARCH] | [LOG OFF]

Friday, May 30, 2008

My Accounts > CONTROL

Steps

① THRESHOLD

$0 — $500 — WEEK — $1,000 — MONTH — $2,000 — QUARTER — $3,000 — YEAR

② CATEGORIES

| Month ▶ | Home | $100 |
| Week ▶ | Restaurants | $25 |
| Month ▶ | Clothing | $200 |
| Month ▶ | Entertainment | $100 |

} $500 Threshold

③ ALERTS

| Ⓐ | 50 - 75% | Doing Good! |
| Ⓐ | 75 - 95% | Getting Close |
| Ⓐ | 95% + | Stop Spending |

Message

ALERT ME
TEXT  123 - 456 - 7890
EMAIL _____

Figure 5b

FINISHLINE provides solutions designed to help you successfully pay off your credit card balances or large purchases to meet your financial goals. You can handle your borrowing confidentially, knowing that there is a tool to help you achieve your financial goals & plan for your future borrowing needs.

① Pick a large purchase or balance amount that you want to pay off
   *Example: $2,500 of your $3,000 balance*

② Select the plan that best fits your goal & payment ability  [FYI – Calculators]

|  | Express | Intermediate | Gradual | Custom |
| --- | --- | --- | --- | --- |
| Monthly Payment | $223.28 | $118.84 | $84.22 | $161.80 |
| Number of Payments | 12 | 24 | 36 | 17 |

③ In your next statement, your FINISHLINE amount will be divided into equal payments & separated so you can monitor your progress ④ To achieve your repayment goal, you can send a check that includes your FINISHLINE payment with your regular credit card payment ⑤ As you make payments, you will your progress and how many payments remain ⑥ Each on-time payment you make earns credits towards reducing your final payment – Earn enough credits and we'll make the last payment for you ⑦ Relax if you don't want to make your FINISHLINE payment this month – your FINISHLINE will be extended a month (the total number of payment will remains the same, you just skip a month)

Figure 6b

SPLIT provides flexibility in managing your account by converting purchases into even monthly payments. With SPLIT, you can treat yourself or manage unexpected expenses without fear that your balance will become a black hole, because you have the knowledge you are successfully pay off your purchases in a timeframe that meets your goals.

① Pick the types of transactions you want automatically SPLIT and how many payments
　　*Examples:*
　　All Merchants　　Transaction less than $1,000　　12 payments
　　　　　　　　　　　　　　OR
　　Insurance　　　　Any transaction　　　　　　　　4 payments
　　Grocery Stores　Transaction greater than $100　4 payments ② After setting up your specifications, any transactions that you make that meet your criteria will be moved into your SPLIT bucket ③ You can also individually move transactions into your SPLIT bucket ④ In your next statement, your SPLIT purchases will be divided into equal payments, including a flat interest amount

| Purchase Date | Merchant | Purchase Amount | May | Jun | Jul | Aug | Sep | Oct |
|---|---|---|---|---|---|---|---|---|
| 5/01 | ACME | $140.41 | $35.95 | $35.95 | $35.95 | $35.95 | | |
| 5/06 | ABC Insurance | $700.00 | $179.76 | $179.76 | $179.76 | $179.76 | | |
| 5/15 | ACME | $265.38 | $68.15 | $68.15 | $68.15 | $68.15 | | |
| 5/16 | TicketMaster | $500.00 | $86.52 | $86.52 | $86.52 | $86.52 | $86.52 | $86.52 |

⑤ To meet your goal of closing out your SPLIT purchases in 4 months, you can send a check that includes your SPLIT payment with your regular credit card payment ⑥ As you make monthly payments, you will be able to see how many payments remain
　　*For Example In August:*

| Purchase Date | Merchant | Purchase Amount | May | Jun | Jul | Aug |
|---|---|---|---|---|---|---|
| 5/01 | ACME | $140.41 | [$35.95] | [$35.95] | [$35.95] | $35.95 |
| 5/06 | ABC Insurance | $700.00 | [$179.76] | [$179.76] | [$179.76] | $179.76 |
| 5/15 | ACME | $265.38 | [$68.15] | [$68.15] | [$68.15] | $68.15 |
| 5/16 | TicketMaster | $500.00 | [$86.52] | [$86.52] | [$86.52] | $86.52 | $86.52 | $86.52 |
| 7/01 | ACME | $191.55 | | | [$49.19] | $49.19 | $49.19 | $49.19 |

⑦ Don't worry if something unexpected happens and you don't make your SPLIT payment – any remaining SPLIT amount from that month will simply be moved to your regular credit card account

Figure 7b

TAKE CHARGE is a feature that automatically moves select purchases into a "Pay in Full" bucket each month. Use TAKE CHARGE to simplify your life by paying off the everyday stuff each month, with the option to take longer to pay down other purchases.

① Select the amount and category of purchases that you want to TAKE CHARGE of

| Grocery Stores | Less than $200 |
|---|---|
| Quick Serve Restaurants | All purchases |
| Gas & Convenience Stores | All purchases |
| Gym Membership | All purchases |
| Drug Stores | Less than $50 |

② During the next statement cycle, any transactions meeting your specifications will be added to your TAKE CHARGE bucket ③ Since your goal is to pay the TAKE CHARGE bucket in full each month, those purchases will not be charged any interest, as long as you pay them in full that month ④ In your next statement, your TAKE CHARGE purchases will be grouped and totaled so you can monitor your spending ⑤ To achieve your goal of not revolving your TAKE CHARGE purchases, you can send a check that includes a TAKE CHARGE payment to zero out your pay off bucket with your regular credit card payment ⑥ Relax if you don't want to pay your TAKE CHARGE purchases this month – if not zeroed out, the remaining amount will simply be moved to your regular credit card account

Statement for account number: 4266.................2290

New Balance  Payment Due Date  Past Due Amount  Minimum Payment   
$1,513.34         05/31/08              $0.00              $152.36

Amount Enclosed [ $         ]  Make your check payable to Chase Card Services. New address or email? Print on back.

42668-            10000030000015133400000007

John Smith
2130 Captain's Way
Phila, PA 19103

CARDMEMBER SERVICE
PO BOX 15153
WILMINGTON DE 19886-5153

⑈ 500016028⑈ 20310755222900⑈

Opening/Closing Date: 04/07/08 – 05/06/08
Payment Due Date:                    05/31/08
Minimum Payment Due:           $152.36

CUSTOMER SERVICE
In U.S.            1-800-436-7927
Español         1-888-446-3308
TDD              1-800-955-8060
Pay by phone  1-800-436-7958
Outside U.S. call collect
                      1-302-594-8200

1005

| VISA ACCOUNT SUMMARY | | Account Number: 4266.....2290 | |
|---|---|---|---|
| Previous Balance | $1,165.22 | Total Credit Line | $11,500 |
| Payment, Credits | -$1,165.22 | Available Credit | $9,986 |
| Purchases, Cash, Debits | -$1877.64 | Total Access Line | $11,500 |
| New Balance | $3175.88 | Available for Cash | $9,986 |

ACCOUNT INQUIRIES
P.O. Box 15298
Wilmington, DE 19850-5298

PAYMENT ADDRESS
P.O. Box 15153
Wilmington, DE 19886-5153

VISIT US AT:

1010

MINIMUM PAYMENT DUE – GOAL BREAKDOWN

|  | Min Pay Due Owed* | Your Monthly Payment Goal** |
|---|---|---|
| Credit Card | $38.51 | $38.51 |
| Take Charge | 0 | 126.19 |
| Split | 53.75 | 170.00 |
| Finish Line | 60.10 | 190.98 |
| TOTAL | $152.36 | $525.68 |

*Your account will be delinquent if you do not make this regulatory payment. To de-enroll or modify your goal settings, call or go online

**To meet your monthly payment goals, enclose $525.68 with your remit coupon.

Figure 10a

TRANSACTIONS

| Trans Date | Reference Number | Merchant Name or Transaction Description | Credit | Debit |
|---|---|---|---|---|
| 07/26 | 24692164209000012345678 | SHELL OIL 91002614200 NEW CASTLE DE | | $27.78 |
| 07/30 | 24226384213320012345678 | WAL MART NEW CASTLE DE | | 10.91 |
| 07/30 | 24492794212409012345678 | ACME MARKETS 7871 S1T OGLETOWN DE | | 123.54 |
| 07/30 | 24610434213072012345678 | BLOCKBUSTER VIDEO #96115 BEAR DE | | 3.03 |
| 07/31 | 74247284213800012345678 | VERIZON PHILADELPHIA PA | | 20.00 |
| 08/03 | 24717054217582012345678 | DELTA AIR 0061085171100 HOUSTON TX | | 1,265.00 |
| 08/16 | 12292292700001012345678 | Payment Thank You Wilmington DE | $276.37 | |
| TOTAL | | | | $1173.89 |

TAKE CHARGE TRANSACTIONS
Description: A feature that automatically moves select purchases into a "Pay in Full" bucket each month.

| Trans Date | Reference Number | Merchant Name or Transaction Description | Credit | Debit |
|---|---|---|---|---|
| 07/29 | 41234645676587687334343 | STARBUCKS | | 8.90 |
| 08/02 | 12346456765876874543354 | SUNOCO | | 100.54 |
| 08/02 | 12346456763484020358768 | MCDONALDS | | 16.75 |
| TOTAL | | | | $126.19 |

SPLIT TRANSACTIONS - AUTOMATIC
Description: Provides flexibility in managing your credit card balance by converting purchases into even monthly payments

| Trans Date | Reference Number | Merchant Name or Transaction Description | Credit | Debit |
|---|---|---|---|---|
| 08/01 | 12346456765876398383887 | MACY'S | | $265.11 |
| 08/14 | 24610434213072012345678 | HOME DEPOT | | 312.45 |
| TOTAL | | | | $577.56 |

Feature Summary

| Description | Original Goal Amount | Previous Balance | Payment Activity | Current Trans | Finance Charge | Balance | Exp Date | Min Due Owed | Goal Min Due |
|---|---|---|---|---|---|---|---|---|---|
| Credit Card 12.99% F APR/Rate | | $1165.22 | $500.00 | $1173.89 | $86.41 | $1925.52 | | $38.51 | $38.51 |
| Finish Line - Home* 12.99% F APR/Rate | 1500.00 | 200.00 | 96.82 | 0 | 16.67 | 103.18 | 6/1/09 | 60.10 | 96.82 |
| Split - Automatic 12.99% F APR/Rate | | 500.00 | 56.57 | 577.56 | 64.95 | 1020.99 | 6/1/09 | 53.75 | 170.16 |
| Take Charge 0% F APR/Rate | | 15.00 | 15.00 | $126.19 | 0 | 126.19 | | 0 | 126.19 |
| Total | $1500 | $1880.22 | $668.39 | $1877.64 | $168.03 | $3175.88 | | $152.36 | $525.68 |

*Finish Line Description: Provides solutions designed to help Cardmembers successfully pay off their credit card balances or large purchases to meet their financial goals. Cardmembers can manually move large transactions or balance into a fixed payment, fixed duration payment plan for a duration of 2-36 months.

Figure 10b

FINANCE CHARGES

| Category | Daily Periodic Rate 30 days in cycle | Corresp. APR | Average Daily Balance | Finance Charge Due To Periodic Rate | Transaction Fee | Accumulated Fin Charge | FINANCE CHARGES |
|---|---|---|---|---|---|---|---|
| Purchases | V.02874% | 10.49% | $0.00 | $0.00 | $0.00 | $0.00 | $0.00 |
| Cash Advances | V.04792% | 17.49% | $0.00 | $0.00 | $0.00 | $0.00 | $0.00 |
| Finish Line - Home   F | 12.99% | | | | | | $16.67 |
| Split   F | 12.99% | | | | | | $64.95 |
| Take Charge   F | 0% | | | | | | $0 |

Total finance charges $81.62

Figure 10c

SYSTEM AND METHOD FOR PROVIDING BORROWING SCHEMES

CROSS REFERENCE TO RELATED APPLICATIONS

The present invention is a continuation of U.S. patent application Ser. No. 13/445,592, filed Apr. 12, 2012, which is a continuation of U.S. patent application Ser. No. 12/561,876, filed Sep. 17, 2009, which is a continuation of U.S. patent application Ser. No. 12/372,510, filed on Feb. 17, 2009, which claims priority to U.S. Provisional Application No. 61/030,474, filed Feb. 21, 2008, the contents of which are incorporated herein by reference in their entirety.

FIELD OF THE INVENTION

The present invention relates to systems and methods for providing credit or other financial services to a consumer. More particularly, the present invention relates to systems and methods for the provision of borrowing schemes that provide users with flexibility in: (1) financing purchases or other transactions, and (2) managing credit, account balances or loans.

BACKGROUND

Increasingly, consumers are growing accustomed to making cash-less purchases and transactions with cards or other transaction devices, such as credit cards, debits cards, gift cards, or other like devices. Credit cards, in particular, offer the consumer easy access to money in exchange for payment of an interest rate on any outstanding balances. Credit limits and interest rates are established based in part on a consumer's income, employment status, and past credit history.

While the use of credit and cash-less transactions have increased dramatically over the years, traditional schemes for offering credit to consumers and processing cash-less transactions in general have not changed much. Most providers of credit require a periodic payment (e.g., monthly) that is based on the outstanding balance and may include interest charges accrued over time. The consumer has little to no ability to define, alter or change the financial terms of obtaining credit, either before or after the credit line is established and transactions are made and balances accrue. As a result, many consumers lack flexibility in using credit. Whether a credit transaction is for a necessary or discretionary purchase, the formula of compounding interest on outstanding balances and submitting periodic payments remains the same.

One solution has been to offer consumers rewards for transactions. These rewards may comprise cash-back, rebates, cash, points or other forms of redeemable value. For example, a consumer that makes purchases with a card or device that is sponsored by or co-branded with an airline may receive airline miles that may be redeemed for free travel. However, while these promotions may serve to induce consumers to pick one card or transaction device over another, they do not provide the consumer with the ability to effect, define, alter or change the terms of a credit relationship.

Another solution gives consumers a line-of-credit which will not accrue interest for a designated period of time. For example, many retail stores offer promotional programs where a consumer can obtain a credit card which will not accrue interest for 90 days, 6 months, one year, or any other desired period of time. Similar promotions do not require a payment for a certain period of time, while others require no payment or interest during a promotional period. While these schemes provide some measure of relief to the consumer, they do not permit the user the ongoing flexibility to designate, define or change the terms of the credit arrangement before or after credit is established. The promotional periods are determined by the credit provider and are not based upon the particular consumer's needs or circumstances. Further, once the promotional period ends, the traditional scheme of periodic payment and compounding interest goes into effect, with little to no ability for the consumer to selectively alter or modify the terms of credit on an as needed basis.

Another known lending approach charges a flat interest amount for a given balance range. For example, a consumer may be charged a first APR for balances up to $1,000, a second APR for balances between $1,001 and $5,000, and a third APR for balance in excess of $5,000. Another known approach permits installment payments to be made on existing balances. Yet another approach lowers next month's APR based on the percentage of a balance paid in the current month/cycle. However, while these approaches afford the consumer some flexibility in obtaining credit, they still do not afford the consumer the ability to designate, define, alter or change the terms of the credit arrangement before or after credit is established. Similarly, current techniques do not offer or issue statements which comprehensively provide a consumer with information and options related to transactions and account balances or loans.

SUMMARY OF THE INVENTION

According to various embodiments, the systems and methods described herein relate to, among other things, borrowing schemes and corresponding statementing features which provide users with flexibility when borrowing funds, cash or other value, or managing balances or other loan particulars. In particular, the systems and methods described herein provide different borrowing schemes, for example, which may be offered to account holders or users of a transaction card or device which may be used for purchases, balance or loan management, or other transactions. The borrowing schemes may be initiated or engaged by a consumer as needed, or offered as promotional products or features by the administrator of an account, transaction card or device, such as, for example, a bank, financial institution, or any individual or entity that may be administering or involved in the issuance or processing of accounts or transactions cards or devices.

Examples of each of the schemes is described below. However, the examples provided are not intended to limit the variations and embodiments of the schemes as appreciated by one of ordinary skill in the art. In addition, the names of the individual schemes are provided only as examples, but are not intended to limit or define in any way the claimed systems and methods.

1) Chase Simple—

In this scheme, a customer may revolve up to a designated balance or transaction amount without paying interest rates. In some embodiments, such designated balance or transaction amount may be selected or designated by the customer before a transaction, at the time of a transaction, or after the transaction. For example, a customer may specify which transactions are to be processed interest-free based upon merchant or vendor identity (e.g., via merchant category code (MCC)), amount spent, transaction level, products or goods purchased, or any other category designation that may be used to identify balances or transactions that are not to accrue interest as set forth herein. For example, a customer may specify that purchases of more than $2,000 not incur interest, or that purchases or transactions with select merchants or for certain types of goods or services not incur interest. Other parameters are possible. As with all the borrowing schemes described herein, a customer may make his or her selections by interacting with an online web site or portal, for example, where the customer may input the necessary parameters required to initiate Chase Simple. Designations and selections may also be made via an interactive voice response system, or a live customer service agent, for example.

In some embodiments, a customer may be required to pay a membership fee, service charge, or make a minimum monthly or other periodic payment, for example, in order to receive the Chase Simple program. The customer may then pay down the principal at the customer's discretion so long as the fee, charge or minimum payment requirement is being met. In some embodiments, the fee, charge or minimum payment may be based on the customer's credit limit or line or other borrowing particular, while in other embodiments it is not based on the credit limit or line or other borrowing particular. In addition, in some embodiments statements may be simplified so that dollar amounts are rounded down. Further, missed payments may be charged by the day or other period of time (e.g., $1/day). In some embodiments, after a predetermined period or cycle of time (e.g., at the end of the first year), the customer may receive an annual borrowing report which includes a progress score, such as, for example, 0-100. The report may show score progress during the year (e.g., improvement/reduction). In some embodiments, parameters of the cardholder's account may be modified such that the customer's monthly membership fee, for example, has been lowered/increased as a result of his borrowing performance. Other parameters may be modified or revised.

According to one embodiment of the systems and methods described herein, a method for providing a borrowing scheme, wherein the method is executed by a programmed computer processor which communications with a user via a network is provided. The method comprising the steps of: establishing an interest-free revolving amount or account using the computer processor; establishing a periodic payment for maintaining the interest-free revolving amount or account using the computer processor; and automatically revising the interest-free revolving amount or account or the periodic payment using the computer processor based upon at least one user performance metric over a predetermined period of time; wherein the interest-free revolving amount or account or the periodic payment for maintaining the interest-free revolving amount is determined by the user via the network.

In another embodiment of the systems and methods described herein, a system for associating a borrowing scheme with a transaction device is provided. The system comprising: a transaction card, device or account associated with a user; and a borrowing scheme processor for receiving from the user a request to associate the card, device or account with an interest-free revolving amount or account and a periodic payment for maintaining the interest-free revolving amount or account, wherein the interest-free revolving amount or account or the periodic payment for maintaining the interest-free revolving amount is determined by a user, and wherein the interest-free revolving amount or account or the periodic payment is revised based upon at least one user performance metric over a predetermined period of time.

In another embodiment of the system and methods described herein, a system for associating a borrowing scheme with a transaction device, comprising: a transaction card, device or account associated with a user; and a borrowing scheme processor for receiving from the user a request to associate the card, device or account with an interest-free revolving amount or account and a periodic payment for maintaining the interest-free revolving amount or account, wherein the interest-free revolving amount or account or the periodic payment for maintaining the interest-free revolving amount is determined by a user via an online portal or by communicating with a live agent, and wherein the periodic payment comprises: (1) a fee or charge, and (2) a daily, weekly, monthly, quarterly, yearly or any other cyclical payment, and wherein the interest-free revolving amount or account or the periodic payment is: (1) revised based upon at least one user performance metric over a predetermined period of time, and (2) comprises a credit or transaction limit, and wherein the at least one user performance metric over a predetermined period of time comprises a predetermined number of timely payments, a predetermined number of transactions, or maintenance of a minimum transaction balance, and wherein the at least one user performance metric over a predetermined period of time comprises a predetermined number of timely payments, a predetermined number of transactions, or maintenance of a minimum transaction balance, and wherein the interest-free revolving amount or account begins to accrue interest if the periodic payment for maintaining the interest-free revolving amount or account is not made.

In another embodiment of the systems and methods described herein an automated method for providing a statement corresponding to a plurality of borrowing schemes, wherein the method is executed by a programmed computer processor which communicates with a user via network is provided. The method comprising the steps of: determining at least one borrowing scheme a user is enrolled in; receiving transaction and account particulars associated with the at least one borrowing scheme for a module or processor associated with the at least one borrowing scheme; automatically generating statement details associated with the at least one borrowing scheme; and providing the statement details to the user via an online statement or a physical hard copy statement.

2) Chase Moments—

In this scheme, a customer may designate a particular event or moment (e.g., having a baby, going to college, vacation, etc.) that is to receive particular borrowing terms or other treatment. Such event or moment may constitute a purchase or other transaction, or any event or period of time during which the customer desires to receive different or modified borrowing terms. For example, the customer may want help financing a big purchase, such as a vacation or other like event. Using Chase Moments, a customer may go online and designate the event or moment (e.g., designate an upcoming vacation). In some embodiments, the systems and methods described herein may prevent various options for the customer to select from, or solicit criteria or information from the customer in order to better define the event or moment or to tailor offers that may be of relevance. For example, the systems and methods described herein may ask or receive from the customer the location, time frame, or other like information associated with the event or moment. In some embodiments, such information may be determined by the administrator of Chase Moments based on the event or moment defined by the customer.

Based on the criteria or information provided by the customer, the systems and methods described herein may then tailor particular offers that may be of interest or relevance to the customer. In some embodiments, for example, assuming the event or moment is the customer's vacation, the customer may receive discounts for hotel, rental car, and other vacation related goods or services. In some embodiments, the customer's purchases or transactions during the trip receive a benefit. In some embodiments, the benefits received may be determined by the administrator, while in some embodiments the benefits are determined by the customer. For example, the customer may get interest on trip purchases deferred for an extra month. Other benefits are of course possible. The next month the customer may get her first statement in the mail. In some embodiments, the customer may earn vacation rewards and receive vouchers that she can use for her next vacation. In some embodiments, the systems and methods described herein may separate vacation expenses and transactions from other transactions, allowing the customer to pay down transactions from the trip or individually, or have such transactions receive particular benefits. In some embodiments, individual transactions associated with the vacation may be organized in such a way that a customer may selectively pay down different trip expenses, such as, for example, lodging, dining, entertainment.

In an embodiment of the systems and methods described herein, a method for providing a borrowing scheme is provided. The method comprising the steps of: determining a designated event; determining parameters associated with the designated event; providing incentives, such as upgrades, discounts or access, for example, associated with the designated event; determining whether a transaction is associated with the designated event; rewarding at least one benefit to the transactions associated with the designated event; and allowing a user to selectively pay down transactions associated with the designated event.

3) My Chase—

This scheme permits a customer to schedule alerts to be delivered to the customer based on customer transaction behavior. In some embodiments, a customer may set alerts for particular types or categories of transactions. Such alerts may be based on thresholds or limits designated by the customer. For example, a customer may request an alert when the customer spends a total $100 on coffee, for example, or spends $20 at a particular merchant or vendor. Thresholds and limits may be set for merchant category code (MCC), merchant or vendor identity, amount spent, transaction level, products or goods purchased, or any other category designation that may be used to initiate the generation and transmission of alerts as set forth herein. In some embodiments, thresholds, limits and category designates are determined by the customer, whereas in some embodiments they are determined by the administrator of the systems and methods set forth herein or any other third party. In some embodiments, the thresholds or limits may be imposed for a predetermined period of time. For example, a customer may designate $500 per year on clothing, or $20 per week on coffee, or $100 per month on dining. Other examples are of course possible.

In some embodiments, alerts may be sent to any location or device that may be designated by the customer, the administrator of the systems and methods described herein, or any third party. For example, alerts can be transmitted via email, telephone, mail, fax, or any other form of communication. Alerts may also be automated, while in some embodiments they may be delivered by a live agent.

In some embodiments, My Chase may be thought of as a budgeting tool that helps a customer manage debt. With My Chase, for example, a customer receives feedback on spending and borrowing, as well as the ability to create limits that make sense for her. For example, the card presents a monthly spending threshold. With My Chase a customer is able to decide how much she wants to borrow on a monthly basis. For example, a customer may choose $500 a month as a general spending threshold. In some embodiments, the customer may divide the $500 across a number of different categories. For example, the customer may set her "clothes" threshold at $300 a month and thresholds for two other categories as well. My Chase also gives the customer the option to set up custom threshold alerts, a valuable feedback loop, and decides when and how the alerts will be sent and personalizes her message.

For example, assume a customer buys a dress. Shortly after the transaction, a customer may get a text message with a threshold alert. The message reassures the customer that she's still comfortably within her borrowing threshold for clothes, and she checks how much more she can borrow this month and still stay on track. Every month, the customer looks at her statement to see a summary of her spending and borrowing activity and how that relates to the personal thresholds she set for herself. In some embodiments, a customer may receive a progress report which tracks how she's doing so that the customer may make adjustments for next month. For example, this month the customer stayed on track with most of her borrowing, but went a little too far with clothes. This might reduce the allocated threshold for clothes (or another category) for next month. The customer's statements breaks transactions down into categories that are meaningful to the customer. In some embodiments, the customer is able to pay down specific categories one by one.

In an embodiment of the systems and methods described herein, a method for providing a borrowing scheme is provided. The method comprising the steps of: receiving a time-based spending alert threshold designation from a user; receiving at least one category of transaction designations from the user, wherein each of the categories is associated with a portion of the time-based spending alert threshold designation; allocating user transactions among the categories; notifying the user of the portion of the time-based spending alert threshold designation for a particular category is being approached or surpassed; and modifying the portion of the time-based spending alert threshold designation for the particular category for the upcoming period of time if the limit is surpassed.

4) Chase Finish Line—

This scheme is designed to help a customer pay down a balance or transaction(s). In some embodiments, the balance or transaction(s) may be determined by the customer, such as by, for example, selecting a portion of an outstanding balance or particular transaction(s) to which a custom, fixed or adjustable pay down plan is to be applied. In some embodiments, the customer may designate particular pay down terms and the systems and methods described herein may determine other pay down terms based on the customer's selections. For example, a customer may designate a pay down goal of two years to pay off a recent purchase and the systems and methods described herein may calculate a required monthly payment that would permit the customer the pay off the transaction in two years. If the monthly payment does not satisfy the customer, the customer may pick a more manageable monthly payment of $400 and the system and method described herein can calculate a how long it would take to pay down the balance or transaction at that monthly rate.

In some embodiments, Chase Finish Line may show progress towards a goal or pay down plan. For example, as the customer diligently makes his $400 monthly payments to pay down a balance or transaction, Chase Finish Line may show progress towards the goal in the statement issued to the customer. In some embodiments Chase Finish Line may issue rewards or other incentives for timely payments to pay down of selected balance or transactions. For example, every on-time payment the customer makes may earn reward points or credits that may be accumulated and redeemed for any number of incentives. Such incentives may relate to the particular balance or transaction being paid down. For example, if the customer stays on track, he may earn sufficient points or credits so that the final payment may be waived or made for him. In some embodiments, points or credits accumulated through Chase Finish Line may be applied to another rewards bank of the customer, such as a rewards program.

In some embodiments, Chase Finish Line may permit the customer to selectively control payment due dates. For example, assume that a year into paying down a particular balance or transaction, the customer finds out his car's transmission needs to be replaced. The customer wants to stay on track with his Chase Finish payments, but this month poses an exceptional challenge for him because of the unexpected expense of replacing the transmission. To accommodate this circumstance, Chase Finish Line permits the customer to push or delay his payment out a month (or any other predetermined period of time) so that the customer may meet the unexpected expense without financial difficulty.

In some embodiments, a customer may use Chase Finish Line to designate any number of balance or transaction buckets, each one of which may be associated with a particular pay down plan. For example, a customer may have a "necessities" bucket devoted to purchases made at a grocery store, home expenses and other like necessities. Another bucket may be devoted to entertainment expenses and may include expenses at restaurants, movie theaters, and other like entertainment related purchases and transactions. Each of these buckets may then be associated with a particular pay down plan which may be revised or modified as needed.

In an embodiment of the systems and methods described herein, a method for providing a borrowing scheme is provided. The method comprising the steps of: receiving at least one pay down parameter associated with at least one transaction or portion of balance amount, wherein the at least one pay down parameter is provided by a user; determining at least one other pay down parameter based on the user selection, wherein the at least one pay down parameter and the at least one other pay down parameter comprise the pay down terms for the transaction balance; and permitting the user to selectively modify the terms of pay down during a pay back period.

5) Chase Split—

Chase Split is a feature that splits purchases into designated payment arrangements, such as, for example, a predetermined number of monthly payments. For example, a customer may choose to split a particular purchase or transaction into 4 monthly payments, into 12 payments, or any number of payments that the customer may desire. The designated payments may then be paid manually or set up through an auto pay arrangement (e.g., a monthly or other cycle payment that would be deducted from the customer's checking or other account). In some embodiments, the systems and methods described herein may also permit the customer to designate an account hierarchy so that a secondary or other account may be utilized if the primary account selection lacks sufficient funds or credit.

In some embodiments, a customer may initiate or engage this feature by designating a particular balance or transaction to be split into any number of payments. Such designation may be made before the transaction, at the time of the transaction, or after the transaction. For example, a customer may access an online portal or other interface associated with the administrator of the systems described herein to select particular parameters that define how transactions should be processed and split. In some embodiments, a customer may set up parameters so that certain types or categories of transactions are split into a predetermined number of payments. In some embodiments, a customer may selectively arrange for the splitting of transactions based upon merchant category code (MCC), dollar value, geographic location, time of transaction, or any other parameter that may be used to process and split transactions. For example, the customer may specify that purchases or transactions over $300 are split automatically into four (or any number of payments), while purchases or transactions that are less than that amount are paid in full. In some embodiments, a customer may specify that purchases or transactions at a particular merchant or category of merchant (e.g., a department store) be split into a designated number of payments, whereas everyday expenses (e.g., groceries, gasoline, etc.) are automatically paid in full or according to another split schedule. Likewise, a customer may designate particular goods or services be split into a designated number of payments. For example, a customer may request that her daily latte purchase be split into two payments or other appropriate or desired payment cycle.

In some embodiments, the systems and methods described herein may impose certain thresholds on split payments. For example, assume a customer purchases a particular dress at a department store. On her first online billing statement, the customer may see the dress laid out in the designated monthly or other cycle payments. The first payment may be, for example, the interest up front ($25), followed by the 4 equal payments of $100. The customer may also see in her statement that smaller expenses are rolled into one sum total of $250. She can split that total into 4 monthly payments or pay it off immediately. The customer may decide to pay off the "other" category right away. In some embodiments, the customer may set a monthly threshold of a designated amount (e.g., $500) so that in the aggregate the total amount due monthly or other cycle does not become unmanageable. In some embodiments, the customer may initiate a message alert option which lets the customer know if she is coming close to her designated threshold.

In some embodiments, the systems and methods described herein may permit the customer to look ahead to future months and anticipate how she is doing with respect to her borrowing thresholds. For each month the customer may see a threshold tracker that provides a quick snapshot of how close her upcoming payments are to her threshold. In addition to making her borrowing predictable, the systems and methods described herein may reward the customer for making her payments. For example, the customer may earn reward points or other value for every on-time split payment.

In an embodiment of the systems and methods described herein, a method for providing a borrowing scheme is provided. The method comprising the steps of: receiving from a user a first pay term parameter associated with a first category of transactions; receiving from the user a second pay term parameter associated with a second category of transactions; categorizing an incoming transaction as a first or second category transaction; and invoicing the user for the upcoming transaction according to the first or second pay term parameter.

6) Take Charge—

Take Charge is a feature that permits a customer to designate certain transactions or balances to be paid in full each month. A customer may designate which transactions or balances are to be paid in full based upon merchant category code (MCC), merchant or vendor identity, amount spent, transaction level, products or goods purchased, or any other category designation that may be used to identify balances or transactions. For example, a customer may designate that any transaction below $200 be paid in full each month, or that all transactions with a particular or category of merchants or for a particular or category of goods or services be paid in full each month. Based on the customer's designations, the systems and methods described herein may process a customer's transactions and add qualifying transactions into a pay-in-full bucket and reported as such in the next statement. The customer may then send a payment to zero out the paid in full bucket, or the customer may enroll in auto pay so that the amount is automatically paid at the end of the month. If the customer does not pay off the paid in full bucket, then the systems and methods described herein may move the balance back to an interest charging bucket, such as a standard revolving balance or a balance associated with any other borrowing scheme.

Another aspect of the invention relates to the statementing of account particulars which correspond to the borrowing schemes described above. For example, in some embodiments, a statementing feature of the invention may organize data and information related to a customer's account into a statement or other account documentation which includes particulars on the customer's transactions with the account, such as transaction date, amount, merchant identity, and other relevant details. In some embodiments, the statementing feature may receive and process data and information related to the various borrowing schemes described, and then organize and incorporate such data and information into a statement or other account document to be presented to the customer. In some embodiments, such statement or other account document may include details about the customer's account transactions and balances, and may particularly present transactions and balances associated with any of the borrowing schemes described herein. In some embodiments, group transactions may be presented on a statement by merchant category code (MCC) to help customers understand spending.

In some embodiments, the statementing feature of the invention may also present a customer with the opportunity to select a desired due date, even though statements may still be issued monthly or periodically. For example, a customer may request that payments be due every two months rather than the traditional monthly cycle. Upon receiving such a request, the statementing feature may calculate the minimum payments that would be due under such a payment cycle, as well as other payment particulars relevant to the borrowing schemes the customer has enrolled in. For example, a statement may present transactions, balances and payments due (including minimum payments) under each of the particular borrowing schemes.

In addition to the specific borrowing scheme details described above, the various borrowing schemes may have certain general characteristics, terminology, functionality or features in terms of how a borrowing scheme is effected or carried out. For example, as used herein, a card, device or account may comprise any card, device or account that may be used to provide funds and/or enter into transactions, such as, for example, purchases, deposits, withdrawals, balance management, loan management, funds transfer, or any other financial transaction. A card or device may also comprise any RFID or biometric capability or functionality to ensure reliable and secure transactions.

In addition, customer or card-holder interaction with a financial institution, for example, in connection with the various borrowing schemes may be accomplished via a network interface (e.g., an online portal) that permits the customer or card holder to receive and provide data and information related to various borrowing schemes. In some embodiments, the interface may permit the customer to interact with the systems and networks that are administering the borrowing schemes, such as, for example, borrowing scheme processing station 105 described in FIG. 1. Such interface may comprise, for example, an internet or other network web site wherein the customer or card holder may interact with the administrator of the borrowing schemes to either initiate participation in or engage a particular scheme. In some embodiments, a customer may interact with a financial institution in connection with the borrowing schemes herein by communicating with a customer service representative (CSR) and providing information and designations relating to the borrowing schemes.

In some embodiments, participation in a particular scheme may require payment of a fee or other charge, while in some embodiments no fee or charge is incurred. In some embodiments, the borrowing schemes disclosed herein may be implemented by the central processing station of the administrator of an account or transaction card or device. For example, the systems or networks which issue or maintain cards or accounts, permit balance or loan management, or process transactions of card members and reconcile accounts of the card members, may offer the various borrowing schemes disclosed herein. In some embodiments, the processing associated with the borrowing schemes may be controlled by various modules, algorithms or processors which perform some or all of the requisite functionality. Such modules, algorithms or processors may be part of or cooperate with the systems or networks which process transactions of card members and reconcile accounts of the card members.

In general, the borrowing schemes comprise various concepts or features that enable a customer (e.g., a cardholder) to better manage or administer his or her balances, loans, use of credit, transactions, and/or expenses. A customer may selectively initiate or engage the schemes on an as-needed basis, or the customer may be enrolled at the time an account or transaction card or device is opened or issued. In some embodiments, the schemes are features that are provided to account holders in the normal course as part of the services and features associated with a particular card, device or account. However, the features are not intended to (but certainly may if the customer so desires) override or trump other payment requirements. For example, if a particular balance or transaction has a minimum payment requirement, the customer need only pay that amount in order to stay current. That is, the payments determined by the various concepts disclosed herein are intended to facilitate and give control to the customer on managing balances and loans, are not intended to complicate matters for the customer by imposing higher payment requirements. In addition, in some embodiments, a customer may participate in any number of schemes, and information regarding any of the schemes may be provided to the customer via statements and other account documentation.

BRIEF DESCRIPTION OF THE DRAWINGS

FIG. 3c illustrates a promotional offer associated with the Chase Simple borrowing scheme, according to various embodiments of the invention.

FIG. 5b illustrates an interface presenting details associated with the My Chase borrowing scheme, according to various embodiments of the invention.

FIG. 6b illustrates yet another process flow for providing the Chase Finish Line borrowing scheme, according to various embodiments of the invention.

FIG. 7b illustrates yet another process flow for providing the Chase Split borrowing scheme, according to various embodiments of the invention.

FIG. 9 illustrates a process flow 900 for providing the Take Charge borrowing scheme, according to various embodiments of the invention.

FIGS. 10a, 10b and 10c collectively illustrate a sample account statement, according to various embodiments of the invention.

DETAILED DESCRIPTION OF EXEMPLARY EMBODIMENTS

Figure 1:
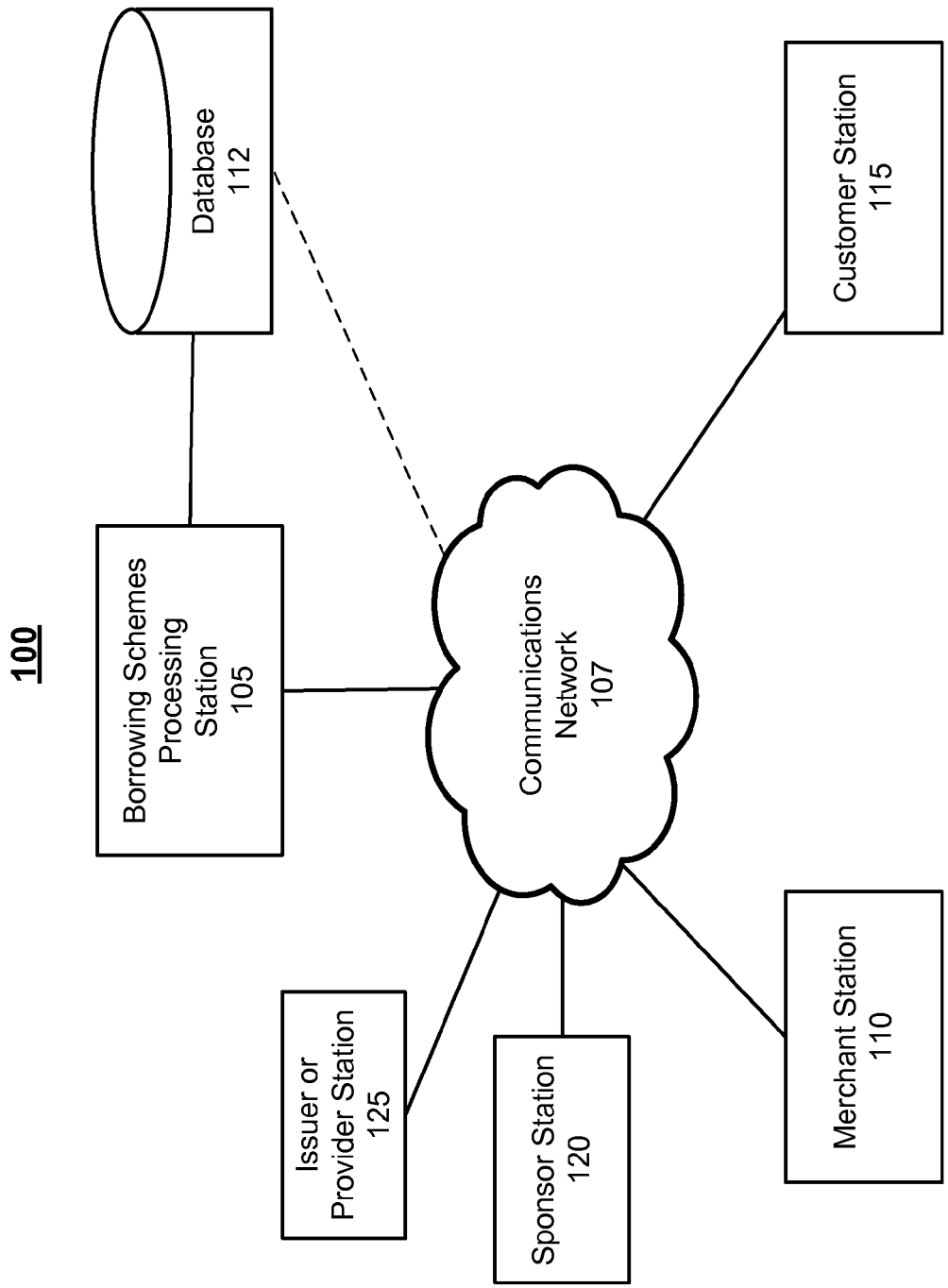
FIG. 1 shows an exemplary system 100 for providing varying borrowing schemes, according to various embodiments of the invention.
Figure 2:
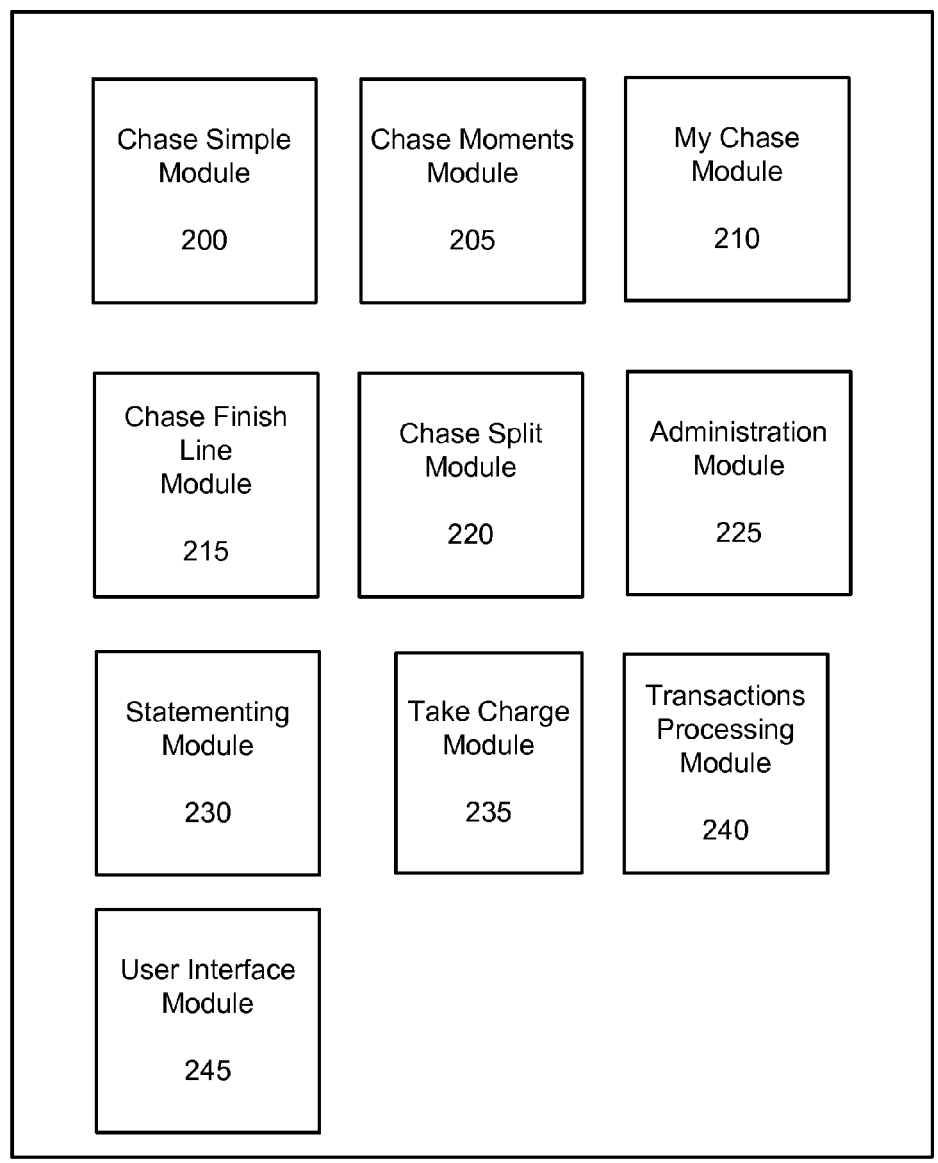
FIG. 2 illustrates various exemplary modules that may be associated with borrowing scheme processing station 105, according to various embodiments of the invention.

The following is a detailed description of various embodiments that implement the borrowing schemes and statementing feature summarized above. Reference will now be made to the present preferred embodiments of the invention, examples of which are illustrated in the accompanying drawings in which like reference characters refer to corresponding elements. FIG. 1 depicts a general system on which the borrowing schemes and statementing feature of the invention may be implemented. FIG. 2 depicts various dedicated modules (e.g. software or executable code that run on any number of processors) that perform features and functionality corresponding to the borrowing schemes and the statementing feature. Chase Simple is particularly depicted in FIGS. 3, 3a, 3b and 3c. Chase Moments is particularly depicted in FIGS. 4 and 4a. My Chase is particularly depicted in FIGS. 5, 5a and 5b. Chase Finish Line is particularly discussed in FIGS. 6, 6a and 6b. Chase Split is particularly depicted in FIGS. 7, 7a and 7b. Other features and schemes are depicted in FIGS. 8 and 9. Lastly, the statementing feature and a sample statement showing account details of select borrowing schemes is depicted in FIGS. 10a, 10b and 10c.

Each drawing will now be described in detail:

I. Overall System Implementation

FIG. 1 illustrates a system 100 for providing borrowing schemes and processing transactions, according to one embodiment of the invention. System 100 may comprise a borrowing schemes processing station 105, which buy itself or in cooperation with other transaction processing systems or networks, provides, issues or processes transactions associated with any number of cards, devices, or accounts. In some embodiments, transactions may be posted to accounts based upon any data or information that may readily be used to determine or identify appropriate accounts to which a transaction should be posted. In some embodiments, borrowing schemes processing station 105 may be administered by a bank, other financial institution, or other third party individual or entity that may provide or issue, or administers transaction devices, such as cards, for example, (e.g., a card-issuer), a merchant or vendor that sponsors or accepts transaction devices (e.g., a sponsor), or any individual, entity or third party that accepts, coordinates, manages or administers customer use of transaction devices or other instruments to conduct transactions. In some embodiments, borrowing schemes processing station 105 may maintain or have access to particulars about customers, transactions, transaction histories, account balances, merchants, and any data or information that may be used to selectively determine particular accounts to which a transaction should be posted, which particular borrowing schemes should be applied or adhered to. In some embodiments, borrowing schemes processing station 105 may comprise a central headquarters or distributed network or repository of the various features and functions of the systems and methods described herein, and may be maintained by or in conjunction with any party or entity that administers the coordination of data and information in connection with the processing of transactions according to the systems and methods described herein.

Borrowing schemes processing station 105 may comprise a single server or engine (as shown). In another embodiment, borrowing schemes processing station 105 may comprise a plurality of servers or engines, dedicated or otherwise, which may further host modules for performing desired system functionality. Borrowing schemes processing station 105, for example, may host one or more applications or modules that function to permit interaction between the users of system 100 (e.g., card holders, customers, card processors merchants, the administrator of borrowing schemes processing station 105, and any other relevant parties) as it relates to exchanging and processing of data and information related to the issuance or provisions of cards or devices or borrowing schemes and processing of transactions as described herein, for example. For instance, borrowing schemes processing station 105 may include an administration module that serves to permit interaction between the system 100 and the individual(s) or entity(ies) charged with administering system 100 or borrowing schemes processing station 105. Such an administration module may enable an agent of borrowing schemes processing station 105, for example, to input information related to permitted transactions/merchants, account particulars, customer information, including but not limited to rules and parameters used to determine to which accounts or customers a particular transaction should be posted to, or which particular borrowing scheme or functionality should be applied. Such rules and parameters may comprise variables that define, for example, a particular type or pool of transactions that are eligible to be processed by a particular customer, merchant, card, device or account. Thus, if a particular card or device or account is associated with a particular borrowing scheme(s), rules may dictate how incoming transactions are to be processed, such as from a billing or invoicing standpoint, for example. Other examples are of course possible. Borrowing schemes processing station 105 may include, for instance, a workstation or workstations running an operating system or platform.

Data and information maintained by borrowing schemes processing station 105 may be stored and cataloged in database 112 which may comprise or interface with a searchable database. Database 112 may comprise, include or interface to a relational database, or other form of database or platform. Database 112 may comprise a single database or a collection of databases, dedicated or otherwise. In one embodiment, database 112 may store or cooperate with other databases to store the various data and information described herein. In some embodiments, database 112 may comprise a file management system, program or application for storing and maintaining data and information used or generated by the various features and functions of the systems and methods described herein. In some embodiments, database 112 may store, maintain and permit access to customer information, transaction information, account information, and general information used to provide borrowing schemes as described herein. In some embodiments, database 112 is connected directly to a borrowing schemes processing station 105, which, in some embodiments, may be accessible through a network, such as communication network 107, for example.

Borrowing schemes processing station 105 may, in some embodiments, be accessed via a communication network 107. Communications network 107 may be comprised of, or may interface to any one or more of, the Internet, an intranet, or any other network or connection. Communications network 107 may also comprise, include or interface to any one or more of a telephone communications network, such as the Public Switched Telephone Network (PSTN). In another embodiment, communication network 120 may comprise a Personal Branch Exchange (PBX), which may further connect to the PSTN.

Borrowing schemes processing station 105 may, in some embodiments, interact, communicate, or otherwise interface with systems and networks that process card or account transactions, such as, for example, a card processor network or a transaction network, such as the Visa™ or MasterCard™ network, for example. Such systems and networks may be internal within a financial institution, while in some embodiments, the systems and networks may be external or third party systems and networks. By interacting with these systems and networks, borrowing schemes processing station 105 (and more particularly the borrowing scheme modules and processors described in FIG. 2) may access data and information on customer transactions that may be used by the various borrowing schemes described herein. For example, if a customer designates certain transaction parameters (e.g., merchant or vendor identity, amount spent, transaction type or level, products or goods purchased, or any other category designation) to designate which transactions are to be processed interest-free under Chase Simple, borrowing scheme processing station 105 may utilize transaction particulars from these systems and identify which transactions satisfy the customer's selections. For example, a customer may specify that purchases made at a particular electronics store not incur interest, or that purchases or transactions for more than $1,000 or for certain types of goods or services not incur interest. Any customer transactions that satisfy or validate the customer's selections would then be processed interest-free under Chase Simple, while those that do not would accrue interest. The other borrowing schemes may also utilize transaction information obtained from these systems and networks in a similar manner. In addition, the transaction and account data may also be used by the statementing feature described herein.

As shown in FIG. 1, merchant station 110 and customer station 115 may communicate with borrowing schemes processing station 105 via communication network 107. Merchant station 110 may comprise, for example, a station utilized by an agent of a merchant to interact or communicate with its customers or borrowing schemes processing station 105. For example, merchant station 110 may comprise a call center facility or station of a card issuer or sponsor that is manned by an operator to receive calls from card members. In some embodiments, merchant station 110 may comprise a point-of-sale system or engine that processes merchant transactions with a customer and which may further cooperate or interact with external systems which carry out card and other transactions (e.g., credit card transactions), including without limitation, for example, borrowing schemes processing station 105. In some embodiments, merchant station 110 may comprise or host web sites or web pages of a merchant that the merchant's customers may access to interact with the merchant, such as to make purchases and inquiries.

Customer station 115 may, in some embodiments, enable a customer of a merchant, a holder of a transactions device, or any other person or entity that may utilize the systems and methods described herein to inquire about or purchase products, services or subscribe to or enroll in a transactions device to interact and communicate with a merchant, a sponsor, financial institution, or with borrowing schemes processing station 105 in connection with the various features and functionality described herein. For example, customer station 115 may enable a customer to call or access the web site or page of a merchant, for example, to browse and possibly purchase a product, or to communicate with borrowing schemes processing station 105.

In some embodiments, customer station 115 may comprise any terminal (e.g., a typical home or personal computer system, telephone, personal digital assistant (PDA) or other like device) whereby a customer may interact with a network, such as communications network 107, for example, that is responsible for transmitting and delivering data and information used by the various systems and methods described herein. Customer station 115 may comprise or include, for instance, a personal or laptop computer, a telephone, or PDA. Customer station 115 may include a microprocessor, a microcontroller or other general or special purpose device operating under programmed control. Customer station 115 may further include an electronic memory such as a random access memory (RAM) or electronically programmable read only memory (EPROM), a storage such as a hard drive, a CDROM or a rewritable CDROM or another magnetic, optical or other media, and other associated components connected over an electronic bus, as will be appreciated by persons skilled in the art. Customer station 115 may be equipped with an integral or connectable cathode ray tube (CRT), a liquid crystal display (LCD), electroluminescent display, a light emitting diode (LED) or another display screen, panel or device for viewing and manipulating files, data and other resources, for instance using a graphical user interface (GUI) or a command line interface (CLI). Customer station 115 may also include a network-enabled appliance, a browser-equipped or other network-enabled cellular telephone, or another TCP/IP client or other device.

Sponsor station 120 may, in some embodiments, comprise a processing system of a sponsor that interacts or interfaces with borrowing schemes processing station 105 to perform the various features and functionality described herein. For example, sponsor station 120 may comprise the various processors, systems or terminals associated with (1) maintaining a listing of individuals or entities entitled to receive certain borrowing schemes, (2) providing or issuing a card or device or account to a recipient, (3) the depositing or association of funds or rewards to accounts of individuals or entities entitled to receive such funds or rewards as described herein, or (4) any feature or functionality performed by a sponsor that is associated with the systems and methods for providing borrowing schemes as described herein. For example, an agent of a sponsor may interact or interface with borrowing schemes processing station 105 via sponsor station 120.

Issuer or provider station 125 may, in some embodiments, comprise a processing system of a financial institution or other card or device issuer or provider that interacts or interfaces with borrowing schemes processing station 105 to perform the various features and functionality described herein. For example, issuer or provider station 125 may comprise the various processors or terminals associated with providing or issuing a card or device to a recipient. In some embodiments, issuer or provider station 125 may also comprise third party systems and processors that cooperate with a financial institution or other provider, for example, to provide or issue cards or devices to individuals, such as, for example, a card vendor's or transaction network's (e.g., Visa or MasterCard) systems or processors.

FIG. 2 illustrates exemplary modules (e.g., software or executable code that runs on any number of processor(s)) that may be associated with borrowing schemes processing station 105 for carrying out (or administering) the various functions and features of the embodiments described herein. In some embodiments, the various modules are associated with or interact with the network or systems which administer an account or card or transaction device, as well as interact, communicate, or otherwise interface with systems and networks that process card transactions, such as, for example, a card processor network or a transaction network, such as the Visa, MasterCard, American Express or Discover network, for example. By interacting with these systems and networks, the modules of FIG. 2 (and more particularly the borrowing scheme modules and processors described in FIG. 2) may access data and information on customer transactions that may be used by the various borrowing schemes described herein. In some embodiments, each of the modules may be accessed by a customer or card holder, for example, via an online portal (e.g., a web site) that presents to the user the various features or functionality or interfaces associated with the borrowing schemes. Such online portal may also permit the customer to provide the necessary data or information required to initiate or engage the particular borrowing scheme(s) desired. In some embodiments, each module may present the user with various graphical user interfaces (GUIs) which present or solicit information from the user that is needed to implement the respective borrowing scheme(s). Other features and functionality are of course possible. While the modules may not be used in all embodiments to perform some or all of the functions of the present invention, they are nonetheless presented as possible embodiments.

Chase Simple module 200 may, in some embodiments, perform or carryout the features and functionality associated with the Chase Simple borrowing scheme. In some embodiments, Chase Simple module 200 may be accessed by a user via an online portal to present and receive data and information relating to the Chase Simple feature. For example, Chase Simple module 200 may receive from a customer a balance or transaction designation to be processed by the Chase Simple scheme. Such designations may be made before a transaction, at the time of a transaction, or after a transaction. The customer may also designate transaction parameters that indicate the types of transactions that are not to accrue interest. For example, a customer may specify which transactions are to be processed interest-free based upon, merchant or vendor identity (e.g., via merchant category code (MCC)), amount spent, transaction level, products or goods purchased, or any other category designation that may be used to identify balances or transactions that are not to accrue interest as set forth herein. For example, a customer may specify that purchases of more than $2,000 not incur interest, or that purchases or transactions with select merchants or for certain types of goods or services not incur interest. Other parameters are possible.

In some embodiments, Chase Simple module 200 may present the customer with any relevant fees or charges associated with designating or maintaining a non-interest bearing balance or transaction under Chase Simple. For example, upon receiving a request from a customer requesting that a $5,000 balance not accrue interest, Chase Simple module 200 may determine a monthly fee or charge (or other periodic or flat fee or charge) that would enable the $5,000 balance to not accrue interest. Such fee or charge may be based on the amount of the balance or transaction, customer's credit history, payment history, or any other parameter that may be used to determine an appropriate fee or charge. In some embodiments, Chase Simple module 200 may revise the fee or charge based upon the user's timely payments, for example. In some embodiments, Chase Simple module 200 may calculate a score or other parameter based upon the customer's borrowing performance. Such score may be based upon, for example, the number of on-time payments made by the customer, how many times the customer exceeded his or her credit limit, the number of payments made above the minimum required, the likelihood of fraud, any risk of default, or any other parameter that may be used to score a customer's performance.

Chase Moments module 205 may, in some embodiments, perform or carryout the features and functionality associated with the Chase Moments borrowing scheme. In some embodiments, Chase Moments module 205 may be accessed by a user via an online portal to present and receive data and information relating to the Chase Moments feature. For example, Chase Moments module 205 may receive from a customer a balance or transaction designation to be processed by the Chase Moments scheme. Such designations may be made before a transaction, at the time of a transaction, or after a transaction. In some embodiments, Chase Moments module may provide a listing of potential moments or events that the user can select from, whereas in some embodiments Chase Moments may receive from the customer certain parameters that may be used to define an event or moment. For example, a customer may provide certain date ranges, geographic locations, merchant names, or any other data or information that may be used to designate an event or moment. In some embodiments, Chase Moments module 205 may present the customer with any relevant fees or charges associated with designating or maintaining a balance or transaction(s) under Chase Moments. For example, upon receiving a request from a customer requesting that expenses accrued during a designated event or moment (e.g., vacation) are to receive a benefit or special treatment (e.g., no interest), Chase Moments module 205 may determine a monthly fee or charge (or other periodic or flat fee or charge) that would enable the $5,000 balance to not accrue interest. In some embodiments, Chase Moments module 205 may issue rewards to the customer on any transactions occurring or balances incurred during the event or moment.

My Chase module 210 may, in some embodiments, perform or carryout the features and functionality associated with the My Chase borrowing scheme. In some embodiments, My Chase module 210 may be accessed by a user via an online portal to present and receive data and information relating to the My Chase feature. For example, My Chase module 210 may receive from a customer, via a GUI, for example, any number of categories or types of transactions or goods or services. For example, the customer may specify transactions for groceries, entertainment, gasoline, or any other category or type of transaction. In some embodiments, a customer may provide My Chase module 210 with threshold amounts that define how much the customer would like to spend in a particular category or type of transaction. For example, a customer might designate a threshold of $200 for monthly (or other period of time) entertainment expenses, and $300 for monthly groceries. In some embodiments, My Chase module 210 may issue alerts as text or graphics to the customer which inform the customer of the status of his or her transactions versus the relevant thresholds. Such alerts may be provided to the customer via any communication channel, such as, for example, electronic mail, page, instant messaging, mail, telephone, or any other form of communication. In some embodiments, My Chase module 210 may modify or revise future thresholds to accommodate excessive spending by the customer in a current cycle. For example, if the customer surpasses his clothing threshold for the given month by $100, My Chase module 210 may reduce next month's clothing threshold by $100.

Chase Finish Line module 215 may, in some embodiments, perform or carryout the features and functionality associated with the Chase Finish Line borrowing scheme. In some embodiments, Chase Finish Line module 215 may be accessed by a user via an online portal to present and receive data and information relating to the Chase Finish Line feature. For example, Chase Finish Line module 215 may receive from a customer a balance or transaction designation to be processed by the Chase Finish Line scheme. Such designations may be made before a transaction, at the time of a transaction, or after a transaction. For example, a customer may designate certain balances or transactions as to which a custom, fixed or adjustable pay down plan is to be applied. In some embodiments, the customer may designate particular pay down terms and Chase Finish Line module 215 may determine other pay down terms based on the customer's selections. For example, a customer may designate a pay down goal of two years to pay off a recent purchase and Chase Finish Line module 215 may calculate a required monthly payment of that would permit the customer the pay off the transaction in two years. If the monthly payment does not satisfy the customer, the customer may pick a more manageable monthly payment of $400 and the Chase Finish Line module 215 may calculate a how long it would take to pay down the balance or transaction at that monthly rate.

Chase Split module 220 may, in some embodiments, perform or carryout the features and functionality associated with the Chase Split borrowing scheme. In some embodiments, Chase Split module 220 may be accessed by a user via an online portal to present and receive data and information relating to the Chase Split feature. For example, Chase Split module 215 may receive from a customer a balance or transaction designation to be processed by the Chase Split scheme. Such designations may be made before a transaction, at the time of a transaction, or after a transaction. For example, a customer may designate certain balances or transactions for which the pay down payment are to be split in a designated manner. In some embodiments, a customer may selectively arrange for the splitting of transactions based upon merchant category code (MCC), dollar value, geographic location, time of transaction, or any other parameter that may be used to process and split transactions. For example, the customer may specify that purchases or transactions over $300 are split automatically into four (or any number of payments), while purchases or transactions that are less than that amount are paid in full. In some embodiments, a customer may specify that purchases or transactions at a particular merchant or category of merchant (e.g., a department store) be split into a designated number of payments, whereas everyday expenses (e.g., groceries, gasoline, etc.) are automatically paid in full or according to another split schedule. Likewise, a customer may designate particular goods or services be split into a designated number of payments. For example, a customer may request that her daily latte purchase be split into two payments or other appropriate or desired payment cycle.

Take charge module 235 may, in some embodiments, perform or carryout the features and functionality associated with the Take Charge borrowing scheme. In some embodiments, a customer may designate certain transactions or balances be paid in full each month. For example, a customer may designate that any transaction below $200 be paid in full each month. A customer may designate which transactions or balances are to be paid in full based upon merchant category code (MCC), merchant or vendor identity, amount spent, transaction level, products or goods purchased, or any other category designation that may be used to identify balances or transactions. Based on the customer's designations, Take Charge module 235 may process customer's transactions and add qualifying transactions into a pay-in-full bucket and reported as such in the next statement. The customer may then send a payment to zero out the paid in full bucket, or the customer may enroll in auto pay so that the amount is automatically paid at the end of the month. If the customer does not pay off the paid in full bucket, then Take Charge module 235 may move the balance back to an interest charging bucket, such as a standard revolving balance or a balance associated with any other borrowing scheme.

Statementing module 230 may, in some embodiments, organize data and information related to a customer's account into a statement or other account documentation. Such data and information may include particulars on the customer's transactions with the account, including but not limited to transaction date, amount, merchant identity, and other relevant details. In some embodiments, statementing module 230 may cooperate or interface with each of Chase Simple module 200, Chase Moments module 205, My Chase module 210, Chase Finish Line module 215, Chase Split module 220, and Take Charge module 235 to receive data and information related to each module's respective borrowing schemes. Statementing module 230 may then organize and incorporate such data and information into a statement or other account document to be presented to the customer. In some embodiments, such statement or other account document may include details about the customer's account transactions and balances, and may particularly present transactions and balances associated with any of the borrowing schemes described herein and appropriate graphics. In some embodiments, transactions may be grouped on statement by merchant category code (MCC) to help customers understand spending. An example of such a statement or account document is presented in FIGS. 10a, 10b and 10c.

In some embodiments, statementing module 230 may also present customers with the opportunity to select a desired due date, even though statements may still be issued monthly or periodically. For example, a customer may request that payments be due every two months rather than the traditional monthly cycle. Upon receiving such a request, statementing module 230 may calculate the minimum payments that would be due under such a payment cycle, as well as other payment particulars relevant to the borrowing schemes the customer has enrolled in. For example, statementing module 230 may present transactions, balances and payments due (including minimum payments) under each of the particular borrowing schemes with the appropriate graphics.

Administration module 225 may, in some embodiments, enable an administrator of borrowing schemes processing station 105, for example, to interact with the various modules, features and functionality described herein. For example, an agent of borrowing schemes processing station 105 may interact with administration module 255 to input, revise and remove data and information used by the various systems and methods described herein, such as, for example, customer information, merchant information, transaction information, or any other data or information that may be used to perform the various features and functionality described herein. In some embodiments, administration module 255 may enable an administrator of borrowing schemes processing station 105 to establish parameters or rules associated with the various features and functionality described herein. For example, an administrator may establish limits, caps, delays, rules or fees associated with a customer's use of the various borrowing schemes described herein. A customer may also be required to pay a fee to be able to be able to process transactions and select accounts as described herein. Such a fee may be, for example, annually or monthly imposed or may be charged on a one-time or per-transaction basis. In some embodiments, the fee may comprise a monetary amount, reward, or any other form of measurable value.

Transactions processing module 240, may in some embodiments, interface with borrowing schemes processing station 105, with any systems or networks that initiate, receive or process transactions (e.g., a merchants point-of-sale systems, a card processor's systems or networks, or a bank's or other financial institution systems or networks that process transactions). Such systems or networks may process data or information relating to transactions conducted with an account or transaction device, such as a debit card, credit card or other like device. In this way, whenever a customer conducts a transaction, borrowing scheme processing station 105, via transactions processing module 240, may receive data and information of relevance to the various borrowing schemes described herein. For example, transactions processing module 240 may provide such data or information to Chase Simple module 200, Chase Moments module 205, My Chase module 210, Chase Finish Line module 215, Chase Split module 220 or any other module depicted in FIG. 2 or herein. For example, data and information acquired via transactions processing module 240 may be used to: (1) identify transactions that may be within certain categories in Chase Simple, Chase Split or My Chase, (2) determine whether a transaction is associated with a designated event in Chase Moments, (3) determine transaction balances in Chase Finish Line, or (4) perform other features and functionality described herein.

User interface module 245 may, in some embodiments, receive user or customer input relating to the various borrowing schemes described herein. For example, user interface 245 may present to the user or customer various GUI's or interfaces corresponding to particular borrowing schemes. Such GUI's or interfaces may enable the user to provide the requisite information and data to initiate a particular borrowing scheme functionality. For example, a user may interface with a GUI corresponding to Chase Split, for example, which requests from the user at least one transaction qualification parameter associated with transaction categories, as well as a term or number of payments designation associated with transaction categories. Similar GUIs and interfaces may enable the user to provide inputs corresponding to the other borrowing schemes. In some embodiments, such GUIs or interfaces may be accessible by the user at certain network locations or web sites, for example. In some embodiments, user interface module 245 may cooperate or interface with each of Chase Simple module 200, Chase Moments module 205, My Chase module 210, Chase Finish Line module 215, Chase Split module 220 and Take Charge module 235 to receive data and information related to each respective borrowing schemes. Such data and information may then be presented to the user as necessary.

II. Chase Simple

In this scheme, a customer may revolve up to a designated balance or transaction amount without paying interest rates. In some embodiments, such designated balance or transaction amount may be selected or designated by the customer before a transaction, at the time of a transaction, or after the transaction. For example, a customer may specify or designate which transactions are to be processed interest-free based upon merchant or vendor identity (e.g., via merchant category code (MCC)), amount spent, transaction level, products or goods purchased, or any other category designation that may be used to identify balances or transactions that are not to accrue interest as set forth herein. For example, a customer may specify that purchases of more than $2,000 not incur interest, or that purchases or transactions with select merchants or for certain types of goods or services not incur interest. Other parameters are possible. A customer may make his or her selections or designations by interacting with an online web site or portal, for example, where the customer may input the necessary parameters. A customer may also make such selections or designations via an Interactive Voice Response or a customer service representative, for example.

The customer may be required to pay a membership fee, service charge, or make a minimum monthly or other periodic payment, for example, in order to receive the Chase Simple program. The customer may then pay down the principal of a balance or transaction covered by Chase Simple at the customer's discretion so long as the fee, charge or minimum payment requirement is being met. In some embodiments, the fee, charge or minimum payment may be based on the customer's credit limit or line or other borrowing particular, while in other embodiments it is not based on the credit limit or line or other borrowing particular. In addition, in some embodiments statements may be simplified so that dollar amounts are rounded down. Further, missed payments may be charged by the day or other period of time (e.g., $1/day). In some embodiments, after a predetermined period or cycle of time (e.g., at the end of the first year), the customer may receive an annual borrowing report which includes a progress score, such as, for example, 0-100. The report may show score progress during the year (e.g., improvement/reduction). In some embodiments, parameters of the cardholder's account may be modified such that the customer's monthly membership fee, for example, has been lowered/increased as a result of his borrowing performance. Other parameters may be modified or revised.

Figure 3:
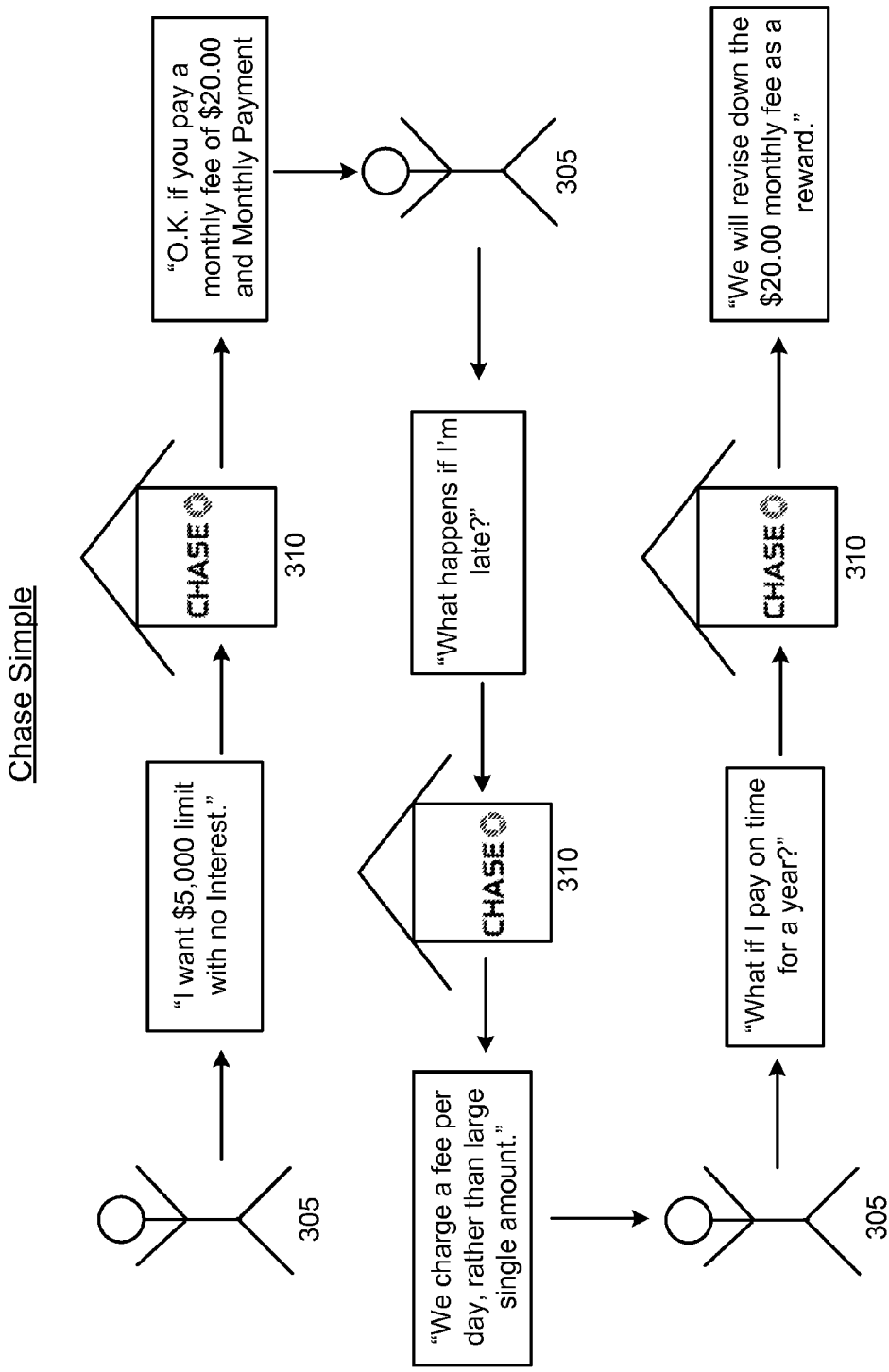
FIG. 3 illustrates a process flow for providing the Chase Simple borrowing scheme, according to various embodiments of the invention.

FIG. 3 illustrates an exemplary process flow for the Chase Simple borrowing scheme. As shown, a customer 305 may approach the financial institution 310 through which the customer maintains an account or a card or transaction device to request initiation of the Chase Simple borrowing scheme. In some embodiments, the request may be made online, such as through an online portal or web site which the customer can interact with to provide the necessary data and information to designate a particular balance or transaction amount that is not to accrue interest. As shown, the customer requests a $5,000 limit with no interest. The financial institution 310 agrees to provide such a limit, so long as the customer pays $20 per month. In some embodiments, the monthly payment is in addition to any payment that may be due under an ongoing balance. If the customer is late in making payment, the financial institution may charge an appropriate fee or charge, such as a daily fee or charge, for example, or the financial institution may start accruing interest on the balance maintained. Other fees or charges may be imposed. If, however, the customer is routinely on time in making payment, the financial institution may revise down (or eliminate) the requisite $20 monthly payment.

Figure 3A:
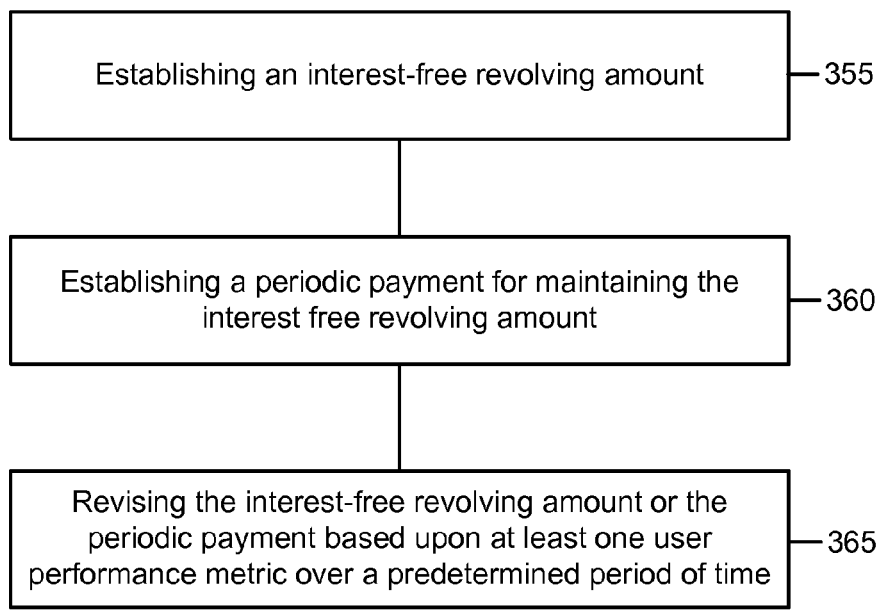
FIG. 3a illustrates another process flow for providing the Chase Simple borrowing scheme, according to various embodiments of the invention.

FIG. 3a illustrates a process 350 for providing a Chase Simple borrowing scheme, according an embodiment of the systems and methods described herein. As shown, at step 355, an interest-free revolving amount may be established. In some embodiments, the amount may be determined or established by or upon the request of a consumer, or upon the offer of a bank, financial institution, or other individual or entity that may administer cards or other transaction devices. In some embodiments, the amount may be associated with a card, device or account. In some embodiments, the amount may comprise a maximum credit limit up to which the user will not be charged interest. At step 360, a periodic payment for maintaining the interest free revolving amount may be established. In some embodiments, the periodic payment amount may comprise a fee that is charged to the user to maintain the interest-free revolving amount. In some embodiments, the amount is fixed regardless of the balance actually maintained, whereas in some embodiments, the fee may increase with the balance. At step 365, the interest-free revolving amount or the periodic payment is revised based upon at least one user performance metric over a predetermined period of time. In some embodiments, the at least one user performance metric may comprise a period of timely monthly payments by the user. That is, if the user makes 12 payments on time, for example, the periodic payment amount may be reduced.

Figure 3B:
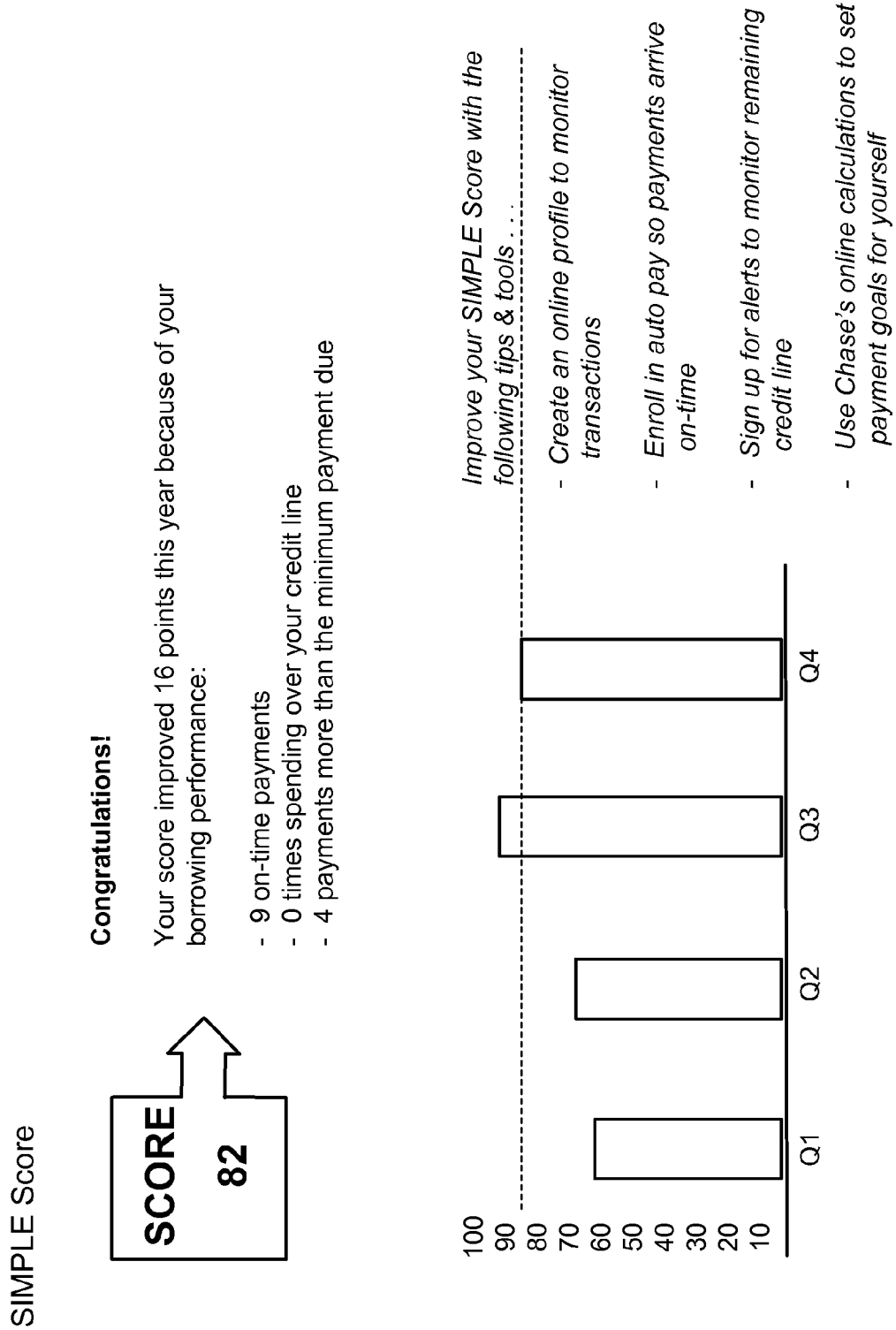
FIG. 3b illustrates an interface presenting details associated with the Chase Simple borrowing scheme, according to various embodiments of the invention.

FIG. 3b illustrates one embodiment of a sample interface showing a score provided to a customer for timely compliance with Chase Simple requirements. As shown, the customer is rewarded a score of 82 (an improvement of 16 points from the previous year) for making 9 on time payments, not spending over the credit line, and making 4 payments above the minimum. In some embodiments, the systems and methods described herein may present other data and information related to the customer's performance, such as, for example, performance statistics and tips or suggestions to improve the score. Scoring may be based upon any appropriate method or algorithm.

FIG. 3c is presented merely as an example of a possible offer to a consumer regarding the Chase Simple borrowing scheme described herein. As shown in FIG. 3c, a consumer may be offered a credit card, for example, which has a zero annual percentage rate (APR), so long as the consumer pays a flat fee of $50.00 per month. If this condition is met, the consumer will not accrue finance charges or incur interest rate fees. Although not shown in the offer, the credit card may specify that only particular transactions qualify for zero interest, or that any and all transactions processed with the card. Other like offers corresponding to the other borrowing schemes set forth herein may also be proposed and presented to consumers.

III. Chase Moments

In this scheme, a customer may designate a particular event or moment (e.g., having a baby, going to college, vacation, etc.) that is to receive particular borrowing terms or other treatment. Such event or moment may constitute a purchase or other transaction, or any event or period of time during which the customer desires to receive different or modified borrowing terms. For example, the customer may want help financing a big purchase, such as a vacation or other like event. Using Chase Moments, a customer may go online and designate the event or moment (e.g., designate an upcoming vacation). In some embodiments, the systems and methods described herein may present various options for the customer to select from, or solicit criteria or information from the customer in order to better define the event or moment or to tailor offers that may be of relevance. For example, the systems and methods described herein may ask or receive from the customer the location, time frame, or other like information associated with the event or moment. In some embodiments, such information may be determined by the administrator of Chase Moments based on the event or moment defined by the customer.

Based on the criteria or information provided by the customer, the systems and methods described herein may then tailor particular offers that may be of interest or relevance to the customer. In some embodiments, for example, assuming the event or moment is the customer's vacation, the customer may receive discounts for hotel, rental car, and other vacation related goods or services. In some embodiments, the customer's purchases or transactions during the trip receive a benefit. In some embodiments, the benefits received may be determined by the administrator, while in some embodiments the benefits are determined by the customer. For example, the customer may get interest on trip purchases deferred for an extra month. Other benefits are of course possible. The next month the customer may get her first statement in the mail. In some embodiments, the customer may earn vacation rewards and receive vouchers that she can use for her next vacation. In some embodiments, the systems and methods described herein may separate vacation expenses and transactions from other transactions, allowing the customer to pay down transactions from the trip or individually, or have such transactions receive particular benefits. In some embodiments, individual transactions associated with the vacation may be organized in such a way that a customer may selectively pay down different trip expenses, such as, for example, lodging, dining, entertainment.

Figure 4:
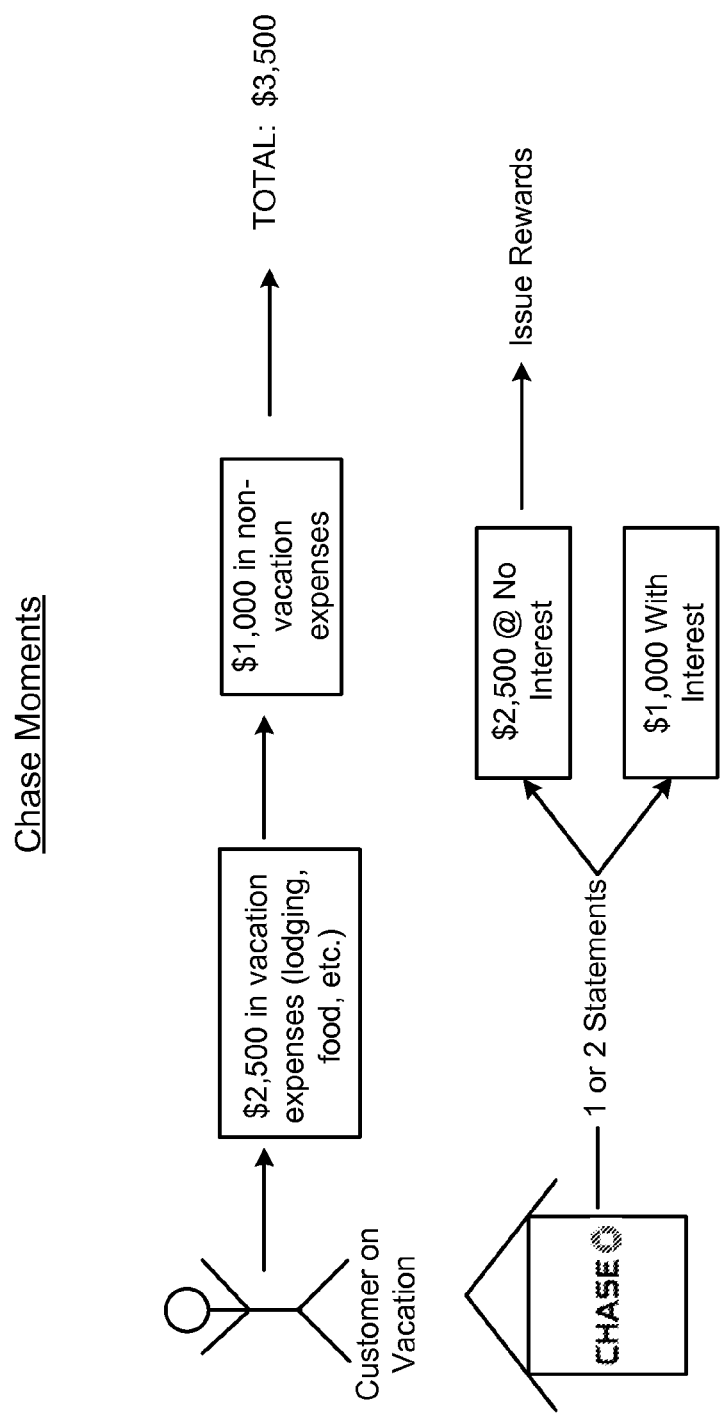
FIG. 4 illustrates a process flow for providing the Chase Moments borrowing scheme, according to various embodiments of the invention.

FIG. 4 illustrates an exemplary process flow for the Chase Moments borrowing scheme. A customer may approach the financial institution through which the customer maintains an account or a card or transaction device, for example, to request initiation of the Chase Moments borrowing scheme. In some embodiments, the request may be made via a customer service representative or online, such as through an online portal or web site which the customer can interact with to provide data and information required by Chase Moments. As shown, a customer may designate an event or moment, in this case a vacation. As shown, the customer enters into $2,500 worth of transactions during the vacation, and $1,000 in non-vacation expenses, for a total of $3,500 in expenses. Under Chase Moments, the systems and methods described herein may issue one or two statements wherein the details of the customer's transactions and balances are presented. Such statement(s) may breakdown the transactions and balances such that Chase Moment balances and transactions (e.g., expenses and transactions during the vacation) are shown receiving a benefit or special treatment (e.g., no interest), and the other expenses being processed in the normal course (e.g., with interest). While the benefit or special treatment given to Chase Moment balances and transactions is the suppression of interest, it may be appreciated that other benefits or special treatment are possible.

Figure 4A:
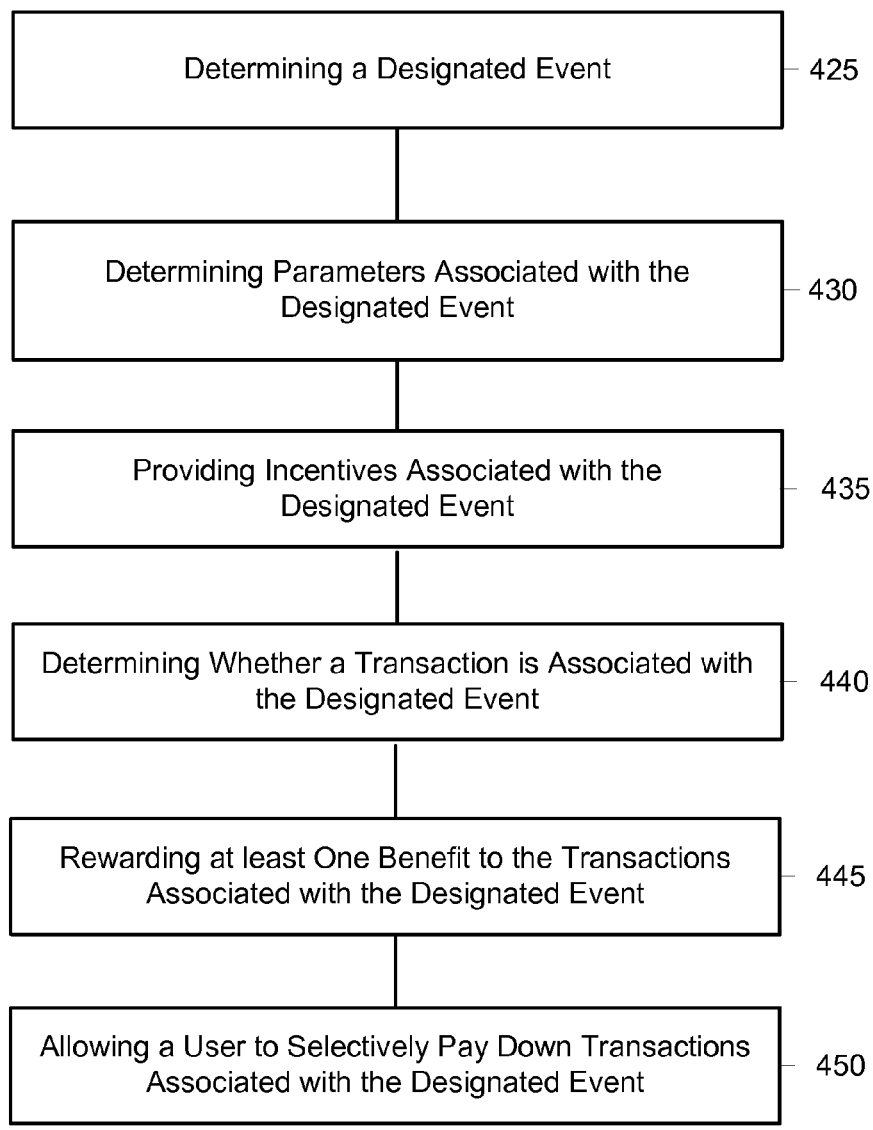
FIG. 4a illustrates another process flow for providing the Chase Moments borrowing scheme, according to various embodiments of the invention.

FIG. 4a illustrates a process 420 for providing the Chase Moments borrowing scheme, according to an embodiment of the systems and methods described herein. At step 425, a designated event is determined. In some embodiments, the designated event may be designated by a user and may comprise a period of time, a transaction or event, for example. For example, an upcoming vacation may comprise the designated event. At step 430, at least one parameter associated with the designated event is determined. For example, such parameter may comprise any data or information that may be used to identify purchases or transactions associated with the designated event. For a vacation, for example, such parameter may comprise the name of the city, state, country, resort or other identifier that may be associated with the vacation. This way, purchases made at a certain location may be identified as being associated with the vacation. Other parameters are possible. At step 435, incentives associated with the designated events are provided. Such incentives may comprise rebates, rewards, coupons, discounter or other promotions that may be associated with the event. At step 440, incoming transactions are assessed to see if they are associated with the designated event. At step 445, at least one benefit is rewarded to transactions associated with the designated event. At step 450, a user is permitted to selectively pay down transactions associated with the designated event.

IV. My Chase

This scheme permits a customer to schedule alerts to be delivered to the customer based on customer transaction behavior. In some embodiments, a customer may set alerts for particular types or categories of transactions. Such alerts may be based on thresholds or limits designated by the customer. For example, a customer may request an alert when the customer spends a total of $100 on coffee, for example, or spends $20 at a particular merchant or vendor. Thresholds and limits may be set for merchant category codes (MCC), merchant or vendor identity, amount spent, transaction level, products or goods purchased, or any other category designation that may be used to initiate the generation and transmission of alerts as set forth herein. In some embodiments, thresholds, limits and category designations are determined by the customer, whereas in some embodiments they are determined by the administrator of the systems and methods set forth herein or any other third party. In some embodiments, the thresholds or limits may be imposed for a predetermined period of time. For example, a customer may designate $500 per year on clothing, or $20 per week on coffee, or $100 per month on dining. Other examples are of course possible. Alerts may be sent to any location or device that may be designated by the customer, the administrator of the systems and methods described herein, or any third party. For example, alerts can be transmitted via email, telephone, mail, fax, or any other form of communication. Alerts may also be automated, while in some embodiments they may be delivered by a live agent. Alerts may be text and/or graphics.

Figure 5:
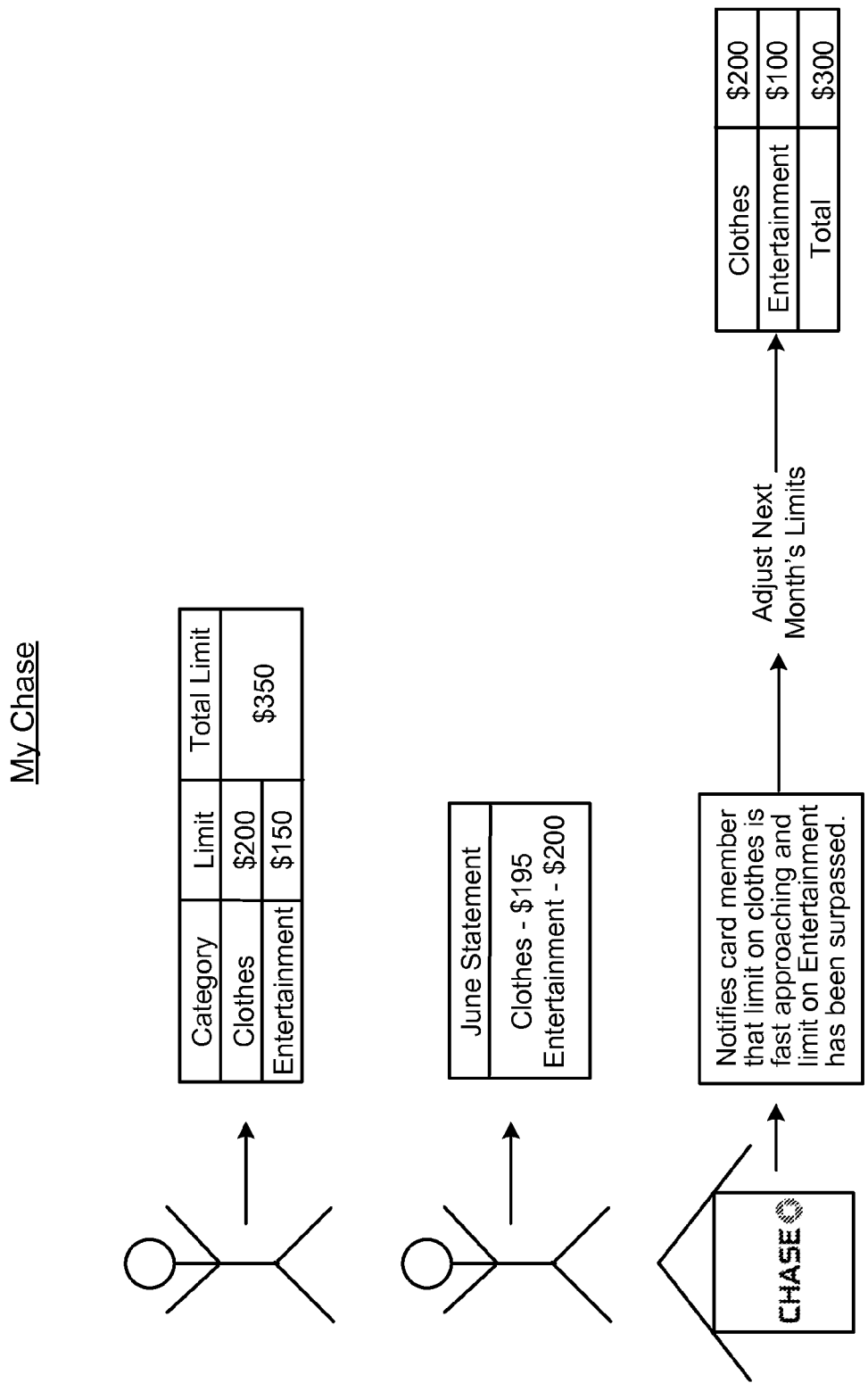
FIG. 5 illustrates a process flow for providing the My Chase borrowing scheme, according to various embodiments of the invention.

FIG. 5 illustrates an exemplary process flow for the My Chase borrowing scheme. A customer may approach the financial institution through which the customer maintains an account or a card or transaction device, for example, to request initiation of the My Chase borrowing scheme. In some embodiments, the request may be made via a customer service representative or online, such as through an online portal or web site which the customer can interact with to provide data and information required by My Chase. As shown, a customer may designate any number of transaction categories and associated limits or thresholds that the customer would like to establish. For example, the customer has designated that all clothing purchases be limited to $200 and that entertainment expenses be limited to $150. In some embodiments, the limits or thresholds may be set for a given cycle, such as daily, weekly month, quarterly, or any other periodic or random period of time. As shown, the customer proceeds to spend $195 on clothing and $200 in entertainment. In response to this, the financial institution may issue the customer an alert notifying the customer that the limit on clothing is fast approaching, and that the entertainment limit has been passed. In some embodiments, the alert may be issued as soon as transaction details are received or according to a predetermined alert schedule. In some embodiments, the financial institution may also revise or modify upcoming limits or thresholds to account for the customer exceeding the entertainment limit for the month.

Figure 5A:
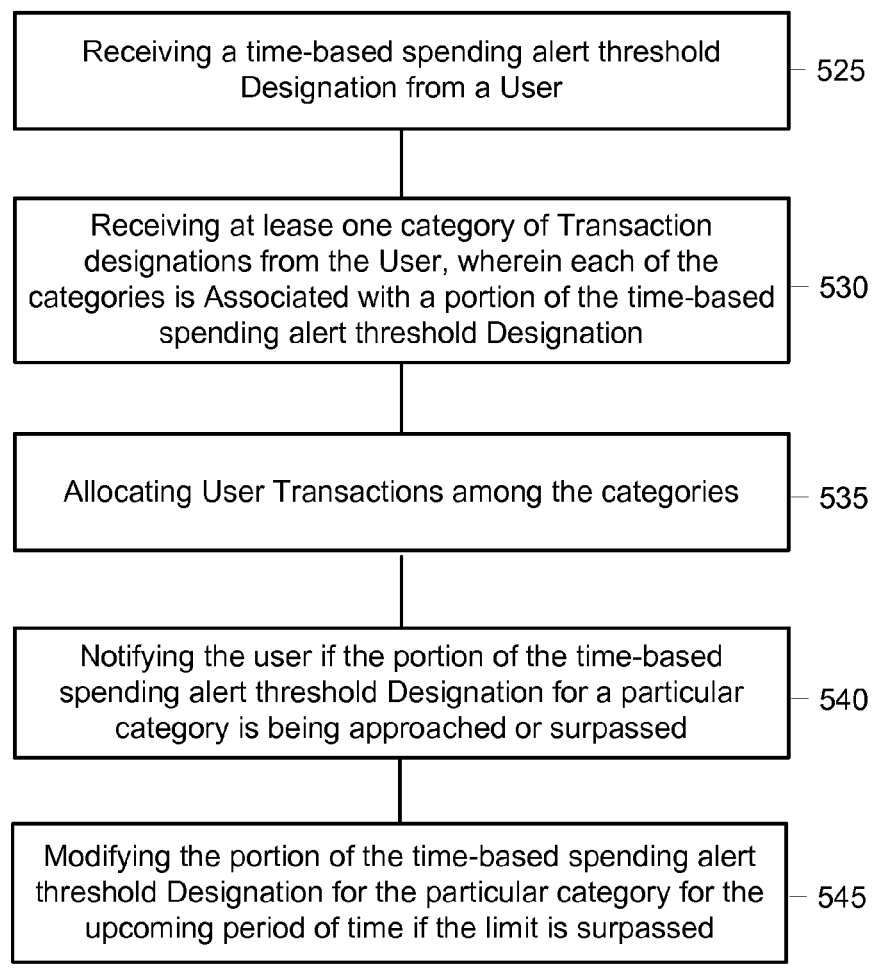
FIG. 5a illustrates another process flow for providing the My Chase borrowing scheme, according to various embodiments of the invention.

FIG. 5a illustrates a process 520 for providing a borrowing scheme according an embodiment of the systems and methods described herein. At step 525 a time-based spending alert threshold designation is received from a user. At step 530 at least one category of transaction designations is received from the user. In some embodiments, each of the categories is associated with a portion of the time-based spending alert threshold designation. At step 535, user transactions are allocated among the categories. At step 540, the user is notified that the portion of the time-based spending alert threshold designation for a particular category is being approached or surpassed. At step 545, the portion of the time-based spending alert threshold designation for the particular category for the upcoming period is modified at that time if the limit is surpassed.

FIG. 5b illustrates one embodiment of an interface the user may interact or interface with to designate transaction categories and associated limits or thresholds. In step 1, for example, the customer selects a total threshold of $500 per month. In step 2, the customer uses drop down menus to particularize thresholds for individual categories: $100 per month for home expenses, $25 per week for restaurants, $200 per month for clothing, and $100 per month for entertainment. In step 3, the customer may designate alert and messaging preferences.

V. Chase Finish Line

This scheme is designed to help a customer pay down a balance or transaction(s). In some embodiments, the balance or transaction(s) may be determined by the customer, such as by, for example, selecting a portion of an outstanding balance or particular transaction(s) to which a custom, fixed or adjustable pay down plan is to be applied. In some embodiments, the customer may designate particular pay down terms and the systems and methods described herein may determine other pay down terms based on the customer's selections. For example, a customer may designate a pay down goal of two years to pay off a recent purchase and the systems and methods described herein may calculate a required monthly payment that would permit the customer the pay off the transaction in two years. If the monthly payment does not satisfy the customer, the customer may pick a more manageable monthly payment of $400 and the system and method described herein can calculate a how long it would take to pay down the balance or transaction at that monthly rate.

In some embodiments, Chase Finish Line may show progress towards a goal or pay down plan. For example, as the customer diligently makes his $400 monthly payments to pay down a balance or transaction, Chase Finish Line may show progress towards the goal in the statement issued to the customer. In some embodiments Chase Finish Line may issue rewards or other incentives for timely payments to pay down of selected balance or transactions. For example, every on-time payment the customer makes may earn reward points or credits that may be accumulated and redeemed for any number of incentives. Such incentives may relate to the particular balance or transaction being paid down. For example, if the customer stays on track, he may earn sufficient points or credits so that the final payment may be waived or made for him. In some embodiments, points or credits accumulated through Chase Finish Line may be applied to another rewards bank of the customer, such as a rewards program.

In some embodiments, Chase Finish Line may permit the customer to selectively control payment due dates. For example, assume that a year into paying down a particular balance or transaction, the customer finds out his car's transmission needs to be replaced. The customer wants to stay on track with his Chase Finish payments, but this month poses an exceptional challenge for him because of the unexpected expense of replacing the transmission. To accommodate this circumstance, Chase Finish Line permits the customer to push or delay his payment out a month (or any other predetermined period of time) so that the customer may meet the unexpected expense without financial difficulty.

In some embodiments, a customer may use Chase Finish Line to designate any number of balance or transaction buckets, each one of which may be associated with a particular pay down plan. For example, a customer may have a "necessities" bucket devoted to purchases made at a grocery store, home expenses and other like necessities. Another bucket may be devoted to entertainment expenses and may include expenses at restaurants, movie theaters, and other like entertainment related purchases and transactions. Each of these buckets may then be associated with a particular pay down plan which may be revised or modified as needed.

Figure 6:
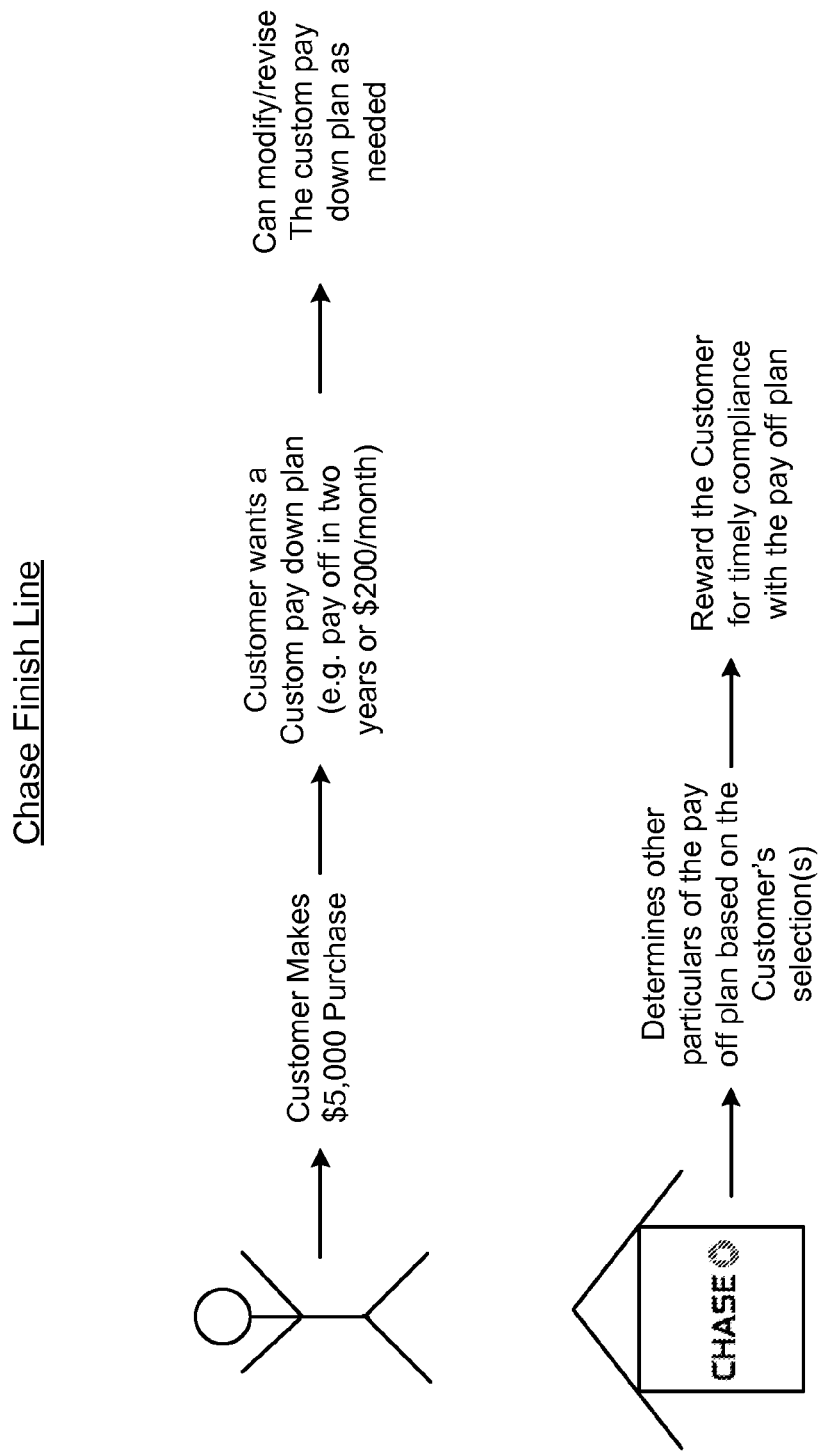
FIG. 6 illustrates a process flow for providing the Chase Finish Line borrowing scheme, according to various embodiments of the invention.

FIG. 6 illustrates an exemplary process flow for the Chase Finish Line borrowing scheme. A customer may approach the financial institution through which the customer maintains an account or a card or transaction device, for example, to request initiation of the Chase Finish Line borrowing scheme. In some embodiments, the request may be made via a customer service representative or online, such as through an online portal or web site which the customer can interact with to provide data and information required by Chase Finish Line. As shown, a customer may make a $5,000 purchase or transaction. The customer may request to pay off the balance in two years or that he would like to pay down the balance by paying $200 per month. The financial institution may then determine other particulars of the pay down arrangement based on the customer's selection. For example, if the customer wants to pay off the balance in two years, the financial institution would determine the minimum monthly payment required, whereas if the customer wants to pay $200 per month, the financial institution would determine how long the customer needs to be making payment. In addition, in some embodiments, the financial institution may reward the customer for timely payment and compliance with the pay down schedule and terms, such as offering to pay the last payment, for example. Other reward forms are possible.

Figure 6A:
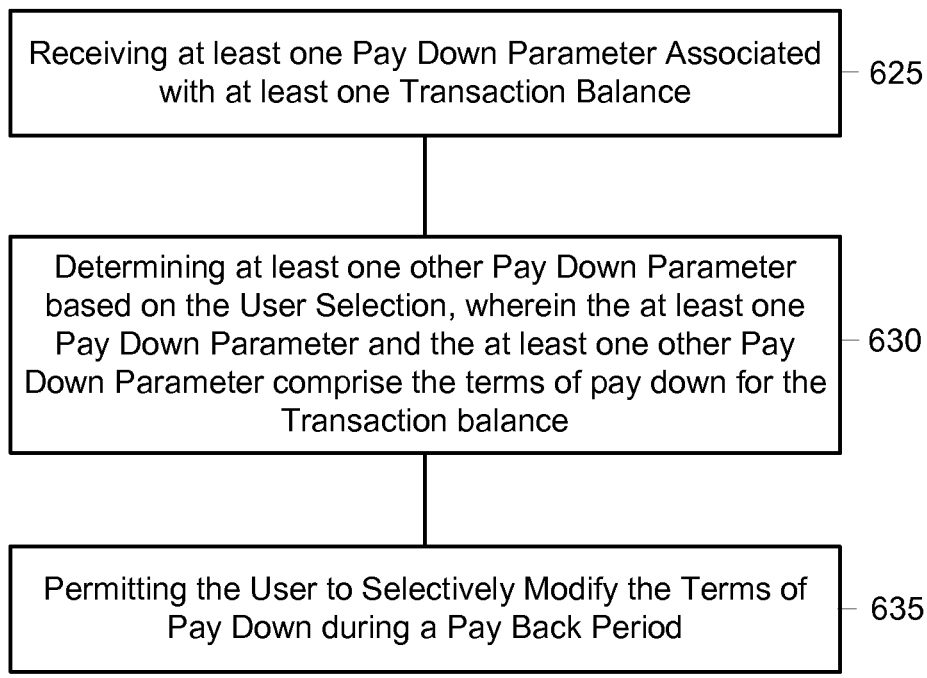
FIG. 6a illustrates another process flow for providing the Chase Finish Line borrowing scheme, according to various embodiments of the invention.

FIG. 6a illustrates a process 620 for providing a borrowing scheme according an embodiment of the systems and methods described herein. At step 625, at least one pay down parameter associated with at least one transaction balance is received. At step 630, at least one other pay down parameter based on the user selection is determined. In some embodiments, the at least one pay down parameter and the at least one other pay down parameter comprise the pay down terms for the transaction balance. At step 635, the user is permitted to selectively modify the terms of pay down during a pay back period.

FIG. 6b illustrates one embodiment of a process flow for Chase Finish Line. As shown, in step 1, a customer may select a balance or transaction to process under Chase Finish Line. At step 2, the customer selects a plan that best fits his schedule. In some embodiments, the various plans may be determined by Chase Finish Line module based on the customer's balance or transaction selection in step 1. At step 3, the customer's next statement will separate the Chase Finish Line transactions so that the customer can monitor progress. At step 4, the customer may send a check or other payment form that includes the Check Finish Line balance. At step 5, the customer can track progress towards the pay down goal. At step 6, the financial institution may reward the customer for compliance with the pay down plan. At any time during the pay down period, the customer may selectively push back a due date, with or without penalty, and the Chase Finish Line module may modify the pay down schedule accordingly.

VI. Chase Split

Chase Split is a feature that splits purchases into designated payment arrangements, such as, for example, a predetermined number of monthly payments. For example, a customer may choose to split a particular purchase or transaction into 4 monthly payments, into 12 payments, or any number of payments that the customer may desire. The designated payments may then be paid manually or set up through an auto pay arrangement (e.g., a monthly or other cycle payment that would be deducted from the customer's checking or other account). In some embodiments, the systems and methods described herein may also permit the customer to designate an account hierarchy so that a secondary or other account may be utilized if the primary account selection lacks sufficient funds or credit.

In some embodiments, a customer may initiate or engage this feature by designating a particular balance or transaction to be split into any number of payments. Such designation may be made before the transaction, at the time of the transaction, or after the transaction. For example, a customer may access an online portal or other interface associated with the administrator of the systems described herein to select particular parameters that define how transactions should be processed and split. In some embodiments, a customer may set up parameters so that certain types or categories of transactions are split into a predetermined number of payments. In some embodiments, a customer may selectively arrange for the splitting of transactions based upon merchant category code (MCC), dollar value, geographic location, time of transaction, or any other parameter that may be used to process and split transactions. For example, the customer may specify that purchases or transactions over $300 are split automatically into four (or any number of payments), while purchases or transactions that are less than that amount are paid in full. In some embodiments, a customer may specify that purchases or transactions at a particular merchant or category of merchant (e.g., a department store) be split into a designated number of payments, whereas everyday expenses (e.g., groceries, gasoline, etc.) are automatically paid in full or according to another split schedule. Likewise, a customer may designate particular goods or services be split into a designated number of payments. For example, a customer may request that her daily latte purchase be split into two payments or other appropriate or desired payment cycle.

In some embodiments, the systems and methods described herein may impose certain thresholds on split payments. For example, assume a customer purchases a particular dress at a department store. On her first online billing statement, the customer may see the dress laid out in the designated monthly or other cycle payments. The first payment may be, for example, the interest up front ($25), followed by the 4 equal payments of $100. The customer may also see in her statement that smaller expenses are rolled into one sum total of $250. She can split that total into 4 monthly payments or pay it off immediately. The customer may decide to pay off the "other" category right away. In some embodiments, the customer may set a monthly threshold of a designated amount (e.g., $500) so that in the aggregate the total amount due monthly or other cycle does not become unmanageable. In some embodiments, the customer may initiate a message alert option which lets the customer know if she is coming close to her designated threshold.

In some embodiments, the systems and methods described herein may permit the customer to look ahead to future months and anticipate how she is doing with respect to her borrowing thresholds. For each month the customer may see a threshold tracker that provides a quick snapshot of how close her upcoming payments are to her threshold. In addition to making her borrowing predictable, the systems and methods described herein may reward the customer for making her payments. For example, the customer may earn reward points or other value for every on-time split payment.

Figure 7:
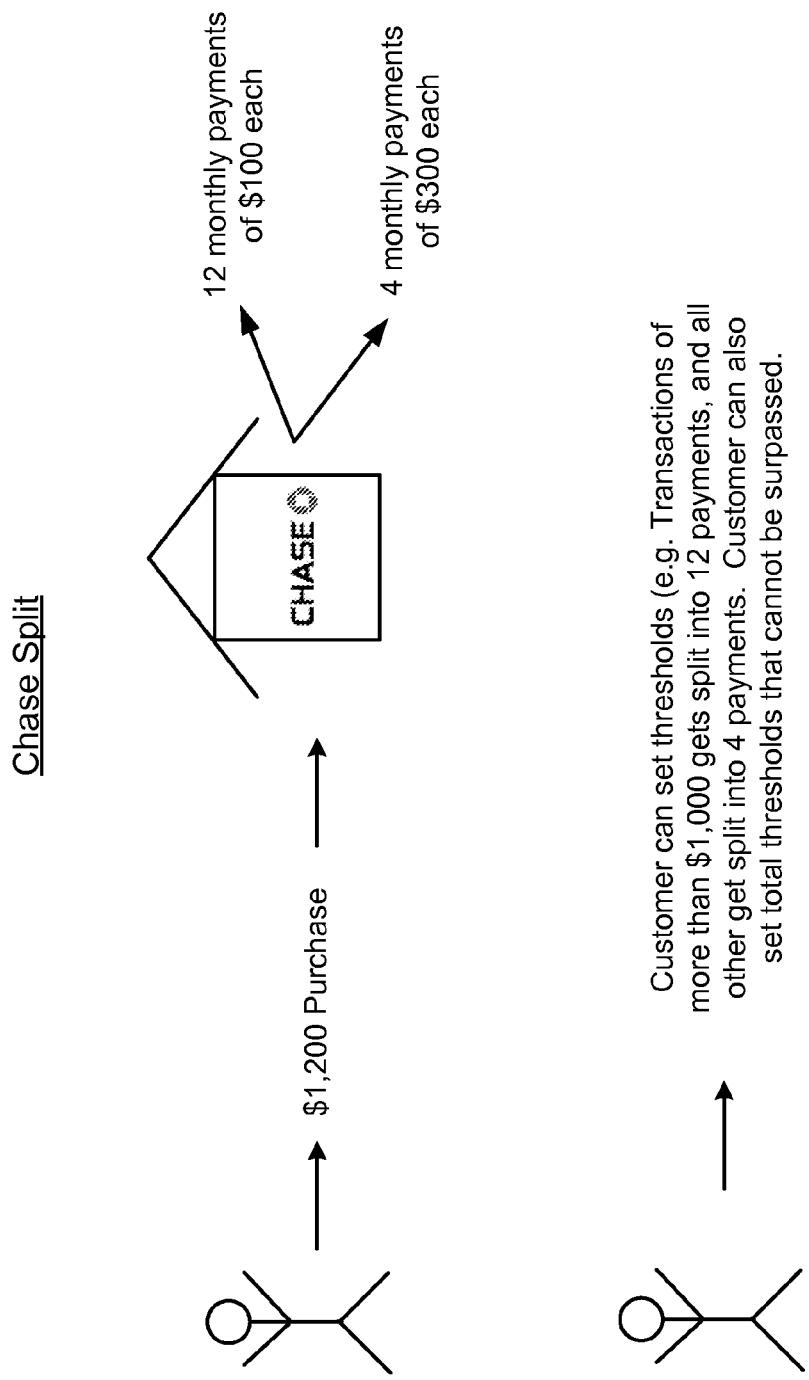
FIG. 7 illustrates a process flow 700 for providing the Chase Split borrowing scheme, according to various embodiments of the invention.
Figure 8:
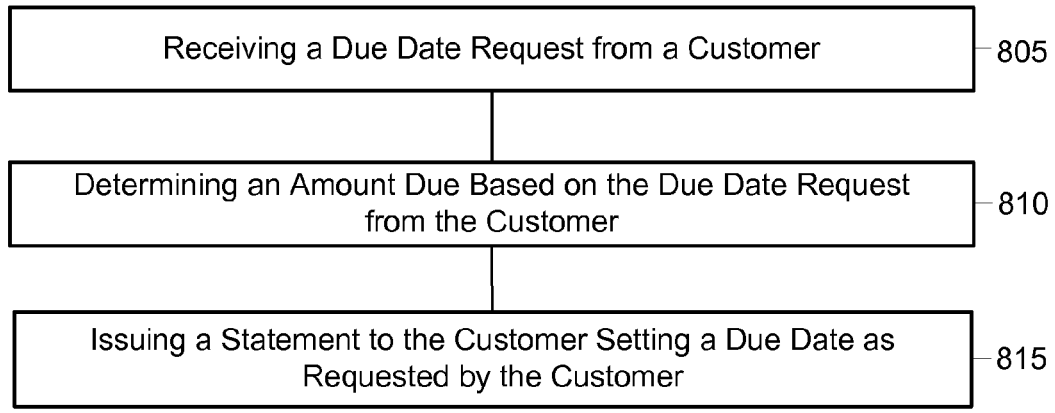
FIG. 8 illustrates a process flow 800 for providing requesting a due date, according to various embodiments of the invention.

FIG. 7 illustrates an exemplary process flow for the Chase Split borrowing scheme. A customer may approach the financial institution through which the customer maintains an account or a card or transaction device, for example, to request initiation of the Chase Split borrowing scheme. In some embodiments, the request may be made via a customer service representative or online, such as through an online portal or web site which the customer can interact with to provide data and information required by Chase Split. As shown, a customer designates $1,200 in purchases be split. The financial institution may then split the balance into any number of payments, such as, for example, 12 monthly payments of $100 each or 4 monthly payments of $300 each. The different split options may be determined by the customer or the financial institution. In some embodiments, the customer may set particular thresholds, such as, for example, that transactions of more than $1,000 get split into 12 payments and all other into 4 payments. The customer may also set total thresholds that should not be surpassed.

Figure 7A:
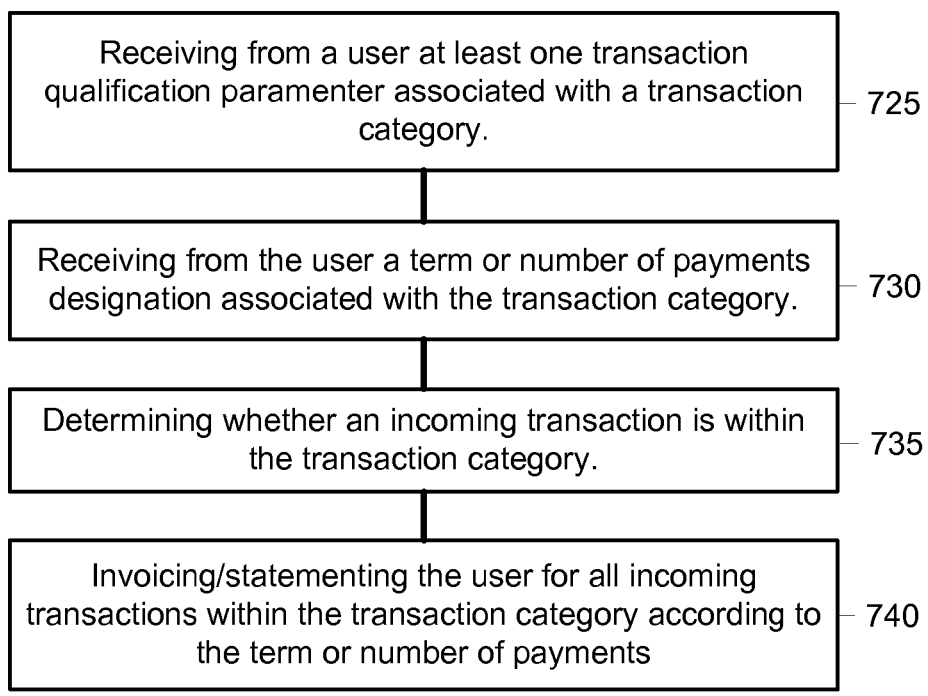
FIG. 7a illustrates another process flow for providing the Chase Split borrowing scheme, according to various embodiments of the invention.

FIG. 7a illustrates a process 720 for providing a borrowing scheme according to an embodiment of the systems and methods described herein. At step 725, a transaction qualification parameter associated with a transaction category is received from a user. At step 730, a term or number of payments designation associated with the transaction category is received from the user. At step 735, a determination is made as to whether an incoming transaction is within the transaction category. In some embodiments, the step of determining whether an incoming transaction is within the transaction category may comprise determining whether the incoming transaction meets the transaction qualification parameter associated with the transaction category. In some embodiments, such determination may be made by borrowing scheme processing station 105, or any other system or network that receives or processes data or information related to customer transactions. At step 740, the user is invoiced for the upcoming transaction according to the paper first or second pay term parameter.

FIG. 7b illustrates one embodiment of a process flow for Chase Split. In step 1, a customer may select the types or categories of transactions the he wants to split and into how many payments. At step 2, the financial institution will comply with the customer's selections and designations and move individual transactions into the appropriate split bucket (e.g., balance). At step 3, a customer may individually move a transaction or balance into a split balance as needed. At step 4, a customer's statement may present the various split balances in an organized manner. At step 5, the customer may send a payment that includes the normal credit card payment, for example, and the split amount that is due. In step 6, statements may be issued to the customer that track performance towards the split goals. At step 7, if the customer misses a split payment, then the missed amount may be moved into a regular credit card balance, for example, or the remaining split payments may be modified (e.g., increased) to account for the missed payment.

VII. Other Features and Borrowing Schemes

FIG. 8 illustrates a process 800 for requesting a specific due date, according to an embodiment of the systems and methods described herein. At step 805, a due date request is received from a customer. At step 810, an amount due is determined based on the due date request received from the customer. At step 815, a statement issued to the customer which sets a due date as requested.

Another borrowing scheme is referred to as Take Charge. Take Charge is a feature that permits a customer to designate certain transactions or balances to be paid in full each month. A customer may designate which transactions or balances are to be paid in full based upon merchant category code (MCC), merchant or vendor identity, amount spent, transaction level, products or goods purchased, or any other category designation that may be used to identify balances or transactions. For example, a customer may designate that any transaction below $200 be paid in full each month, or that all transactions with a particular merchant or category of merchants or for a particular or category of goods or services be paid in full each month. Based on the customer's designations, the systems and methods described herein may process a customer's transactions and add qualifying transactions into a pay-in-full bucket and reported as such in the next statement. The customer may then send a payment to zero out the paid in full bucket, or the customer may enroll in auto pay so that the amount is automatically paid at the end of the month. If the customer does not pay off the paid in full bucket, then the systems and methods described herein may move the balance back to an interest charging bucket, such as a standard revolving balance or a balance associated with any other borrowing scheme.

FIG. 9 illustrates a process flow for the Take Charge scheme. At step 1, a customer may select balances or transactions that he would like paid in full. At step 2, any transactions that fall within the customer's designations may be added to a paid in full bucket (e.g., balance) that does not accrue interest so long as the customer does in fact pay the amount of each month (or other appropriate cycle), as stated in step 3. At step 4, the customer's statement will group all pay in full transactions and balances so that the customer may track his progress. At step 5, upon receiving the statement, for example, the customer may send a check that includes the normal credit card amount due, for example, and the paid in full amount that is due. At step 6, if the paid in full amount is not zeroed out, then the balance may be moved to the normal credit card bucket wherein thereafter it will accrue interest.

VIII. Statementing Feature and Sample Statement

Another aspect of the invention relates to the statementing of account particulars which correspond to the borrowing schemes described above. For example, a statementing feature of the invention may organize data and information related to a customer's account into a statement or other account documentation which includes particulars on the customer's transactions with the account, such as transaction date, amount, merchant identity, and other relevant details. In some embodiments, the statementing feature may receive and process data and information related to the various borrowing schemes described, and then organize and incorporate such data and information into a statement or other account document to be presented to the customer. Such statement or other account document may include details about the customer's account transactions and balances, and may particularly present transactions and balances associated with any of the borrowing schemes described herein. In some embodiments, group transactions may be presented on a statement by merchant category code (MCC) to help customer's understand spending.

In some embodiments, the systems and methods described herein may provide a user with a statement (e.g., a monthly or other periodic statement) which provides transaction and account details corresponding to one or more borrowing schemes the user has enrolled in. In so doing, statementing module or processor, for example, may first need to determine the borrowing schemes a user is enrolled in. This may be done by querying each of the borrowing scheme modules or processors of FIG. 2, for example, for the enrollment status of a particular user. If the user is enrolled in a particular borrowing scheme for a given cycle or period of time, for example, statementing module or processor may then receive from the corresponding borrowing scheme processor or module the user's transaction and account particulars associated for the given cycle or period of time. Next, statementing module or processor may automatically generate statement details associated with the at least one borrowing scheme, and thereafter provide the statement details to the user via an online statement or a physical hard copy statement. In some embodiments, the statement details may comprise a listing of all borrowing schemes the user has enrolled in, transaction and account history for each of the borrowing schemes, a total minimum payment amount due, and a comparative summary of account activity under each of the borrowing schemes. Other details are possible. For example, the user's total minimum payment amount may comprise at least the sum of minimum payments due under each of the borrowing schemes the user has enrolled in.

The statementing feature of the invention may also present a customer with the opportunity to select a desired due date, even though statements may still be issued monthly or periodically. For example, a customer may request that payments be due every two months rather than the traditional monthly cycle. Upon receiving such a request, the statementing feature may calculate the minimum payments that would be due under such a payment cycle, as well as other payment particulars relevant to the borrowing schemes the customer has enrolled in. For example, a statement may present transactions, balances and payments due (including minimum payments) under each of the particular borrowing schemes.

FIGS. 10a, 10b, and 10c depict an embodiment of a statement 1000 that presents to a customer or card holder, for example, data and information related to the borrowing schemes set forth herein. As shown in FIG. 10a, the information provided relates to an account ending in 2290. Section 1005, titled "Visa Account Summary" presents information commonly provided by existing account statements and invoices. Section 1010, titled "Minimum Payment Due—Goal Breakdown," presents information related to various schemes selected or added by the customer to his or her account. As shown, 1010 illustrates to the customer what makes up the minimum amount due and the monthly payment so that the consumer can organize his or her spending. For example, the minimum payment is composed of credit charges of $28.51, Chase Split charges of $53.75 and Finish Line charges of $60.10. The monthly payment goal for the various borrowing schemes may also be presented. FIG. 10b illustrates the customer's transactions for the period, and include transactions corresponding to the particular borrowing schemes. In addition, the statement, as shown in FIGS. 10b and 10c, may also present more particularized data so that the customer appreciates how balances and payments are determined.

Hereinafter, aspects of implementation of the invention will be described. As described above, FIG. 1 shows embodiments of a system of the invention. The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example. As described herein, a module performing functionality may comprise a processor and vice-versa.

As noted above, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It is appreciated that in order to practice the method of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications and equivalent arrangements.

The embodiments of the present inventions are not to be limited in scope by the specific embodiments described herein. For example, although many of the embodiments disclosed herein have been described with reference to contribution of money or funds to a transactions device, the principles herein are equally applicable to the contribution of any type of benefit, reward or other value that may identified and contributed to a transactions device. In addition, although many of the embodiments disclosed herein have been described with reference to a savings and transactions processing station that is associated with an administrator of financial instrument or device programs, such as a bank, for example, it should be appreciated that various aspects of the invention may be accomplished when various system components are located elsewhere or administered by other individuals or entities. For instance, the borrowing schemes processing station 105 described herein may be maintained and administered by a third party service provider. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims.

Further, although the embodiments of the present inventions have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breadth and spirit of the embodiments of the present inventions as disclosed herein.

What is claimed:

1. A method, comprising:
receiving a selection, from a user, of a borrowing scheme for an account through an interface via a network, wherein a bucket, that is part of the account and associated with the borrowing scheme is established and wherein further the borrowing scheme has a set of criteria that determines whether the borrowing scheme applies to a particular transaction for a purchase of goods or services from a merchant;
receiving, by a programmed computer processor, over the network, a designation of a monthly payment amount for the bucket, from the user, wherein the monthly payment amount for the bucket applies to any balance associated with the bucket and is independent of any other balances associated with the account and the designation is performed without calculation of a separate fee;
receiving transaction information, via the network, relating to a transaction conducted by the user, the transaction being for a purchase of goods or services from a merchant; and
determining whether the transaction meets the set of criteria that determines whether the borrowing scheme applies;
performing, upon a successful determination, by the programmed computer processor, an allocation of an amount associated with the transaction to the bucket;
receiving, from the user, on a recurring basis, a payment comprising the monthly payment amount for the bucket;
allocating the monthly payment amount for the bucket to pay down at least a portion of a balance associated with the bucket.

2. The method of claim 1, wherein the account is a credit card account.

3. The method of claim 1, wherein the monthly payment amount for the bucket pays down only a portion of the balance associated with the bucket.

4. The method of claim 1, wherein the account is an interest free account.

5. The method of claim 1, wherein the monthly payment amount for the bucket is established by the user after the balance is accumulated in the bucket.

6. The method of claim 1, wherein the monthly payment amount for the bucket is established by the user prior to conducting the transaction.

7. The method of claim 1, further comprising:
assessing the user a penalty upon the payment failing to cover the monthly payment amount for the bucket.

8. The method of claim 1, wherein the network is the Internet.

9. The method of claim 8, wherein the monthly payment amount for the bucket is received from the user via a website.

10. The method of claim 9, wherein the website has a graphical user interface through which the user submits the monthly payment amount for the bucket.

11. A method, comprising:
receiving a selection, from a user, of a borrowing scheme for an account through an interface via a network, wherein the borrowing scheme comprises establishing an interest free bucket that is part of the account and associated with the borrowing scheme and wherein further the borrowing scheme comprises a set of criteria that determines whether the borrowing scheme applies to a particular transaction for a purchase of goods or services from a merchant;
receiving, by a programmed computer processor, over the network, a designation of a monthly payment amount for the bucket, from the user, wherein the monthly payment amount for the bucket applies to any balance associated with the bucket and is independent of any other balances associated with the account;

assessing the user a periodic fee for establishing the monthly payment amount for the bucket;

receiving transaction information, via the network, relating to a transaction conducted by the user, the transaction being for the purchase of goods or services from a merchant; and determining whether the transaction meets the set of criteria that determines whether the borrowing scheme applies;

performing, upon a successful determination, by the programmed computer processor, an allocation of an amount associated with the transaction to the bucket;

receiving, from the user, on a recurring basis, a payment comprising the monthly payment amount for the bucket and the periodic fee;

allocating the monthly payment amount for the bucket to pay down at least a portion of a balance associated with the bucket.

12. The method of claim 11, wherein the account is a credit card account.

13. The method of claim 11, wherein the monthly payment amount for the bucket pays down only a portion of the balance associated with the bucket.

14. The method of claim 11, wherein the monthly payment amount for the bucket is established by the user after the balance is accumulated in the bucket.

15. The method of claim 11, wherein the monthly payment amount for the bucket is established by the user prior to conducting the transaction.

16. The method of claim 11, further comprising:

assessing the user a penalty upon the payment failing to cover the monthly payment amount for the bucket.

17. The method of claim 11, further comprising:

assessing the user a penalty for failing to pay the periodic fee.

18. The method of claim 11, wherein the network is the Internet.

19. The method of claim 18, wherein the monthly payment amount for the bucket is received from the user via a website.

20. The method of claim 19, wherein the website has a graphical user interface through which the user submits the monthly payment amount for the bucket.

* * * * *